(12) United States Patent
Baldwin

(10) Patent No.: US 7,215,344 B2
(45) Date of Patent: May 8, 2007

(54) TRIANGLE CLIPPING FOR 3D GRAPHICS

(75) Inventor: David Robert Baldwin, Weybridge (GB)

(73) Assignee: 3DLabs, Inc. Ltd, Hamilton (BM)

( * ) Notice: Subject to any disclaimer, the term of this patent is extended or adjusted under 35 U.S.C. 154(b) by 721 days.

(21) Appl. No.: 09/133,741

(22) Filed: Aug. 13, 1998

(65) Prior Publication Data

US 2002/0030693 A1    Mar. 14, 2002

Related U.S. Application Data

(60) Provisional application No. 60/071,590, filed on Jan. 15, 1998.

(51) Int. Cl.
*G09G 5/00* (2006.01)

(52) U.S. Cl. .................................................. 345/620

(58) Field of Classification Search ................ 345/433, 345/434, 117, 118, 121, 682, 620
See application file for complete search history.

(56) References Cited

U.S. PATENT DOCUMENTS

| 5,361,386 A | * | 11/1994 | Watkins et al. | ............. 345/430 |
| 5,613,052 A | * | 3/1997 | Narayanaswami | .......... 345/434 |
| 5,809,219 A | * | 9/1998 | Pearce et al. | ............... 345/426 |
| 5,877,773 A | * | 3/1999 | Rossin et al. | ............... 345/434 |
| 6,344,852 B1 | | 2/2002 | Zhu | |

OTHER PUBLICATIONS

Ivan E. Sutherland, "Micropipelines", Jun. 1989, Communications of the ACM, vol. 32, pp. 720-738.*
Sutherland, Ivan E. et al. "Reentrant Polygon Clipping", Communications of the ACM Jan. 1974, vol. 17, #1, pp. 32-42.

* cited by examiner

*Primary Examiner*—Thu V. Nguyen

(57) ABSTRACT

A geometry and lighting graphics accelerator with an improved clipping process. Clipping is performed prior to any calculation or evaluation of primitives for lighting, texture, fog, or color. Barycentric coordinates are used to define all vertices: original, intermediate, and final intersection points. Use of barycentric coordinates results in less storage space. A circular buffer is used during the clipping process to store input and output polygons. Use of the circular buffer also results is reduced storage requirements.

29 Claims, 6 Drawing Sheets

TRIANGLE CLIPPING FOR 3D GRAPHICS

CROSS-REFERENCE TO RELATED APPLICATION

This application claims priority from 60/071,590, filed Jan. 15, 1998, which is hereby incorporated by reference.

BACKGROUND AND SUMMARY OF THE INVENTION

The present application relates to graphics rendering hardware for computer graphics and animation systems, and particularly to clipping of such graphics in preparation for rendering.

Computer Graphics and Rendering

Modern computer systems normally manipulate graphical objects as high-level entities. For example, a solid body may be described as a collection of triangles with specified vertices, or a straight line segment may be described by listing its two endpoints with three-dimensional or two-dimensional coordinates. Such high-level descriptions are a necessary basis for high-level geometric manipulations, and also have the advantage of providing a compact format which does not consume memory space unnecessarily.

Such higher-level representations are very convenient for performing the many required computations. For example, ray-tracing or other lighting calculations may be performed, and a projective transformation can be used to reduce a three-dimensional scene to its two-dimensional appearance from a given viewpoint. However, when an image containing graphical objects is to be displayed, a very low-level description is needed. For example, in a conventional CRT display, a "flying spot" is moved across the screen (one line at a time), and the beam from each of three electron guns is switched to a desired level of intensity as the flying spot passes each pixel location. Thus at some point the image model must be translated into a data set which can be used by a conventional display. This operation is known as "rendering."

The graphics-processing system typically interfaces to the display controller through a "frame store" or "frame buffer" of special two-port memory, which can be written to randomly by the graphics processing system, but also provides the synchronous data output needed by the video output driver. (Digital-to-analog conversion is also provided after the frame buffer.) Such a frame buffer is usually implemented using SDRAM memory chips (or sometimes with SGRAM or VRAM). This interface relieves the graphics-processing system of most of the burden of synchronization for video output. Nevertheless, the amounts of data which must be moved around are very sizable, and the computational and data-transfer burden of placing the correct data into the frame buffer can still be very large.

Even if the computational operations required are quite simple, they must be performed repeatedly on a large number of datapoints. For example, in a typical high-end configuration, a display of 1280×1024 elements may need to be refreshed at 72 Hz, with a color resolution of 24 bits per pixel. If blending is desired, additional bits (e.g. another 8 bits per pixel) will be required to store an "alpha" or transparency value for each pixel. This implies manipulation of more than 3 billion bits per second, without allowing for any of the actual computations being performed. Thus it may be seen that this is an environment with unique data manipulation requirements.

If the display is unchanging, no demand is placed on the rendering operations. However, some common operations (such as zooming or rotation) will require every object in the image space to be re-rendered. Slow rendering will make the rotation or zoom appear jerky. This is highly undesirable. Thus efficient rendering is an essential step in translating an image representation into the correct pixel values. This is particularly true in animation applications, where newly rendered updates to a computer graphics display must be generated at regular intervals.

The rendering requirements of three-dimensional graphics are particularly heavy. One reason for this is that, even after the three-dimensional model has been translated to a two-dimensional model, some computational tasks may be bequeathed to the rendering process. (For example, color values will need to be interpolated across a triangle or other geometric structure constituting the objects of a graphic) These computational tasks tend to burden the rendering process. Another reason is that since three-dimensional graphics are much more lifelike, users are more likely to demand a fully rendered image. (By contrast, in the two-dimensional images created e.g. by a GUI or simple game, users will learn not to expect all areas of the scene to be active or filled with information.)

FIG. 6 is a very high-level view of processes performed in a 3D graphics computer system. A three dimensional image which is defined in some fixed 3D coordinate system (a "world" coordinate system) is transformed into a viewing volume (determined by a view position and direction), and the parts of the image which fall outside the viewing volume are discarded. The visible portion of the image volume is then projected onto a viewing plane, in accordance with the familiar rules of perspective. This produces a two-dimensional image, which is now mapped into device coordinates.

3D Graphics

Three-dimensional graphics (3D graphics) refers to the practice of presenting a scene or image on a two-dimensional screen in such a way that it appears three dimensional. To do so, much care must be taken to accurately display surface textures, lighting, shadowing, and other characteristics. Displaying a 3D graphics image is much more difficult than displaying a traditional 2D image.

3D Graphics Requirements 3D graphics takes a great deal of computer processing power and memory. One of the performance measures for 3D games is frame rate, expressed in frames-per-second (fps), meaning the number of times each second an image can be redrawn to convey a sense of motion.

3D Graphics Concepts 3D graphics are spatial data represented in polygonal form with an associated set of characteristics, such as light, color, shade, texture, etc. The 3D graphics pipeline consists of two major stages, or subsystems, referred to as geometry and rendering. The geometry stage is responsible for managing all polygon activities and for converting 3D spatial data into pixels. The rendering stage is responsible for managing all memory and pixel activities. It renders data from the geometry stage into the final composition of the 3D image for painting on the CRT screen.

Before consulting how a scene is broken down to allow the computer to reconstruct it, one has to start with a scene which consists of shapes. The modeling process creates this information. Designers use specialized 3D graphics software tools, such as 3D Studio, to build polygonal models destined to be manipulated by computer.

3D Graphics Pipeline

The first stage of the pipeline involves translating the model from its native coordinate space, or model coordinates, to the coordinate space of the application, or world coordinates. At this stage, the separate and perhaps unrelated coordinate systems defining objects in a scene are combined in a single coordinate system referred to as world space (World Space Co-ordinates). Translating objects into world space may involve clipping, or discarding elements of an object that fall outside the viewport or display window.

Interactive 3D graphics seek to convey an illusion of movement by changing the scene in response to the user's input. The technical term for changing the database of geometry that defines objects in a scene is transformation. The operations involve moving an object in the X, Y, or Z direction, rotating it in relation to the viewer (camera), or scaling it to change the size. (The X coordinate is moving left to right; Y is moving from top to bottom; Z is moving from "in front" to behind.)

When any change in the orientation or position of the camera is desired, every object in a scene must be recalculated relative to the new view. As can be imagined, a fast-paced game needing to maintain a high frame rate will demand a great deal of geometry processing. As scene complexity increases (more polygons) the computational requirements increase as well.

The setup stage is the point in the 3D pipeline where the host CPU typically hands off processing tasks to the hardware accelerator. Setup is the last stage before rasterization, or drawing, and can consume considerable processing time. The computational demands of the setup process depend on the number of parameters required to define each polygon as well as the needs of the pixel drawing engine.

Background: Barycentric Coordinates

Given a frame in three-dimensional World Space, a local coordinate system can be defined with respect to the frame. When given a set of points in three-dimensional space, a local coordinate system can also be constructed. These types of coordinate systems are called barycentric coordinates.

Barycentric coordinates are a method of introducing coordinates into an affine space. If the coordinates sum to one, they represent a point; if the coordinates sum to zero, they represent a vector. Consider a set of points $P_0, P_1, \ldots P_n$ and consider all affine combinations that can be taken from these points. That is, all points P that can be written as $\alpha_0 P_0 + \alpha_1 P_1 + \ldots + \alpha_n P_n$ for some $\alpha_0 + \alpha_1 + \ldots$ set of points forms an affine space and the coordinates $(\alpha_0, \alpha_1, \ldots, \alpha_n)$ are called the barycentric coordinates of the points of the space.

These coordinate systems are quite useful, and used extensively, when working with polygons such as triangles.

Point in a Triangle

FIG. 4 depicts a triangle object. Consider three points $P_1$, $P_2$, $P_3$ in a plane. If $\alpha_1$, $\alpha_2$, and $\alpha_3$ are scalars such that $\alpha_1 + \alpha_2 + \alpha_3 = 1$ then the point P defined by $P = \alpha_1 P_1 + \alpha_2 P_2 + \alpha_3 P_3$ is a point on the plane of a triangle formed by $P_1$, $P_2$, $P_3$. The point is within the triangle $\Delta P_1 P_2 P_3$ if $0 \leq \alpha_1, \alpha_2, \alpha_3 \leq 1$. If any of the $\alpha$'s is less than zero or greater than one, the point P is outside the triangle. If any of the $\alpha$'s is 0, P is on one of the lines joining the vertices of the triangle.

EXAMPLE

Points P, Q, R of FIG. 4 were calculated using the following $\alpha$'s:

P: $\alpha_1 = \alpha_2 = \frac{1}{4}, \alpha_3 = \frac{1}{2}$

Q: $\alpha_1 = \frac{1}{2}, \alpha_2 = \frac{3}{4}, \alpha_3 = -\frac{1}{4}$

R: $\alpha_1 = 0, \alpha_2 = \frac{3}{4}, \alpha_3 = \frac{1}{4}$

Point P is within the triangle because all of its scalars are between 0 and 1. Point Q lies outside the triangle because one of its scalars is less than 0. Point R lies on a line joining two of the triangle's vertices because one of its scalars is equal to 0.

Local coordinates can be converted to barycentric coordinates for a given set of points. Given Frame $F = (v_1, v_2, \ldots, v_n, O)$ for an affine space A, any point P in the space can be represented uniquely as:

$P = p_1 v_1 + p_2 v_2 + \ldots + p_n v_n + O$, where $(p_1, p_2, \ldots p_n)$ are the coordinates of the point P with respect to the frame F. Points $P_i$ can be defined as:

$P_0 = O$ $P_1 = O + v_1$ $P_2 = O + v_2$ $\ldots$ $P_n = O + v_n$

That is, the origin of the frame and the points obtained by adding the coordinate vectors to the origin). $p_0$ can be defined to be:

$p_0 = 1 - (p_1 + p_2 + \ldots + p_n)$.

Then P can be written as:

$P = P_0 + p_1(P_1 - P_0) + p_2(P_2 - P_0) + \ldots + p_n(P_n - P_0)$.

The affine equivalent of P is then:

$P = p_0 P_0 + p_1 P_1 + \ldots + p_n P_n$ where $p_0 + p_1 + \ldots + p_n = 1$

In this form, the values $(p_0, p_1, \ldots, p_n)$ are barycentric coordinates of P relative to the points $(P_0, P_1 \ldots P_n)$ Background: 3D Viewing In 3D graphics, the image can be viewed from multiple angles and distances. The visible portion of entire image is that part of the image which can be seen through a projection window. Like a camera lens which defines the image projected onto film, a projection window can be anywhere from wide angle to macro, defining a wide or narrow view of the complete 3D image. The projection window is used to define a view volume. Only the objects within the view volume are rendered to the display screen. The view volume and the objects it encompasses are determined by the type of projection being displayed. FIG. 2 depicts a parallel projection, the view volume is an infinite parallelepiped. FIG. 3 depicts a perspective view, the view volume is a truncated pyramid, known as a frustrum. The viewing frustrum of FIG. 3 is depicted the sides angled at 45 degrees. However, a viewing frustrum can be defined with sides of varying angles. For simplicity, both parallelepipeds and truncated pyramids will be referred to as a frustrum.

In addition to a projection window, a near plane and a far plane can also be defined. These planes are parallel to the projection window and are used to eliminate objects from viewing based on their depth. Such planes allow objects far from the view plane, which would project as a single point to be removed from view. These planes also allow objects close to the view plane which might obscure other objects or be so large as to be unrecognizable to be removed from view. With near and far planes, a finite frustrum is created. That is, a frustrum bounded by six planes, near and far, left and right, and top and bottom, whose objects are rendered to a display according to the perspective of the projection window.

Background: 3D Clipping

A 3D graphics rendering system can save processing time by not rendering an entire image but rendering only the part of the image that lies in the frustrum. Clipping is the process of identifying and saving all the objects, or parts of objects, that are within the frustrum. Objects that are not within the frustrum are discarded.

Clipping can be performed on points, lines, or polygons. These points, lines, and polygons are known as primitives. Primitives define the shape of components of an object, using the positioning data of a coordinate system to describe how they fit together to construct an object. Clipping of a point results in the point being either outside or inside the viewing frustrum. Clipping of lines may result in new line segments, some outside and some inside the frustrum. Clipping of polygons may result in more than one polygon being within the frustrum. In traditional graphics rendering, clipping is performed once all the parameters for lighting, texture, color, fog, and other appearance parameters have been evaluated for each primitive.

Generally, clipping, particularly polygon clipping, is performed using one of several well-known algorithms such as the Sutherland and Hodgman polygon clipping algorithm. The Sutherland and Hodgman clipping technique is an iterative process which clips by comparing each polygon (primitive) to a particular clipping plane of the frustrum (near, far, left, right, top, and bottom). The result is a new output polygon, a set of vertices which defines the clipped area that is in the interior of the frustrum with respect to the particular clipping plane. This clipping process is documented in the paper REENTRANT POLYGON CLIPPING by I. Sutherland and G. Hodgman, which is hereby incorporated by reference and summarized in any good computer graphics text, however a brief description is included here for completeness.

The clipping algorithm for a polygon against a single clipping plane considers the input vertices $P_1, P_2, \ldots P_n$ one at a time. For each such input vertex zero, one or two of the output vertices $Q_1, Q_2, \ldots Q_m$ will be generated, depending on the input with respect to the clipping plane. Each input vertex, P, except the first is considered to be the terminal vertex of an edge: namely the edge defined by the input vertex value, P, and the position, S, of the just previous input vertex saved internally in a register. The algorithm will generate output vertices from the set $Q_1, Q_2, Q_m$ depending on the relationship between the input vertex, P, the saved vertex, S, and the clipping plane. The four basic relationships between the plane and the edge SP are:

S and P are both visible Output P.
S and P are both invisible Output nothing.
S is visible and P is not Compute the intersection of SP with the plane and output.
P is visible and S is not Compute the intersection of SP with the plane and output. Also output P.

The beginning and end of the polygon need to be handled as a special case.

The simplest way to clip the polygon against multiple planes is to clip against the first plane as outlined above. This results in a new polygon which is clipped against the next plane and so on until all the planes have been used.

The usual implementation of the Sutherland and Hodgman algorithm requires the use of two separate buffers for holding the vertices of the input and output polygons. Before each successive clipping stage, the output polygon becomes the input polygon for the next stage. Therefore, each buffer must be large enough to hold the maximum number of vertices that can be produced. Each clip plane can add at most one extra vertex so with 12 clip planes and 4 vertices enough storage for a maximum of 16 vertices is required in each of the two buffers.

The Sutherland and Hodgman algorithm can be made recursive, however, it offers no real advantages in terms of performance or storage.

Improved Triangle Clipping for 3D Graphics

Unlike traditional clipping, the disclosed improved clipping process is performed prior to any lighting, fog, or texture calculations, including parameter evaluations for primitives. In the disclosed improved clipping process, all vertices are defined using barycentric coordinates. Improved clipping is performed against 6 viewing frustrum planes and 6 user defined planes. The clipping algorithm used is the Sutherland and Hodgman Polygon clipper. The vertex is visible in the viewing frustrum only if it is within the left and right, top and bottom, and near and far planes of the frustrum. The vertex must also be visible within any user defined clipping planes to be visible. The result of comparing a vertex against these 12 planes is at least one polygon and a code which indicates in which of the 12 planes the vertex is visible.

When an intersection point of two vertices needs to be calculated, barycentric coordinates are found rather than coordinates values (xyzw), color values (rgba), fog value (f), texture values (stq), specular-reflection coefficient value $(k_s)$, and diffuse-reflection coefficient value $(k_d)$. The barycentric values take up less storage space. However, intersection points which are within the clip planes require extra computations to yield the parameter values at the intersection.

Unlike traditional clipping methods which store the input and output clipped polygons in two separate buffers which are ping-ponged between, the disclosed improved clipping method uses circular buffering. A circular buffer is advantageous in an iterative clipping algorithm because the entries are processed sequentially and once an entry has been processed it is not needed again.

Additionally, a user definable threshold value can be set such that short lines and small triangles can avoid being clipped providing they don't cross the near or far frustrum clipping planes or any of the user clip planes.

A particular advantage of the disclosed clipping process is that clipping is performed prior to any evaluations of lighting, fog, or texture. This advantage allows expensive procedures, in terms of processing time, to be performed only on vertices that are most likely to appear in the frame. Another advantage of the disclosed clipping process is that use of barycentric coordinates saves in computation time as well as storage space.

Another advantage is that during the clipping process, many intermediate vertices are generated but the interpolated parameters do not need to be calculated for these intermediate points. Only the final intersection points, once clipping is complete have the full set of parameters calculated.

Another advantage is that the use of circular buffering saves storage.

Another advantage is that the use of circular buffering eliminates the ping-pong effect of accessing two separate buffers for polygon clipping.

Another advantage is that the user may define the point at which short lines or small triangles are clipped. If the line or triangle is not clipped, the whole line or triangle is rasterized in full and the screen and window scissor is used to discard out of view fragments. Thus, computationally intensive steps are saved.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation), in which:

Preferred System Context

The system context of the presently preferred embodiment is a GAMMA 3D Geometry and Lighting Accelerator chip for 3D graphics rendering using, among others, the OpenGL, Direct 3D, and QuickDraw 3D applications programming interfaces (APIs). The Hardware Reference Manual and Programmer's Reference Manual for this chip describe further details of this sample embodiment, and are both hereby incorporated by reference. Both are available, as of the effective filing date of this application, from 3Dlabs Inc. Ltd., 181 Metro Drive, Suite 520, San Jose, Calif. 95110. The geometry and lighting functions of graphics rendering are traditionally performed by the host computer. However, the GAMMA 3D Geometry and Lighting Accelerator is designed to be used in conjunction with a graphics accelerator such as GLINT™ to performing the actual graphics rendering more efficiently, relieving the host of some rather expensive (in terms of time) functions.

Figure 1:
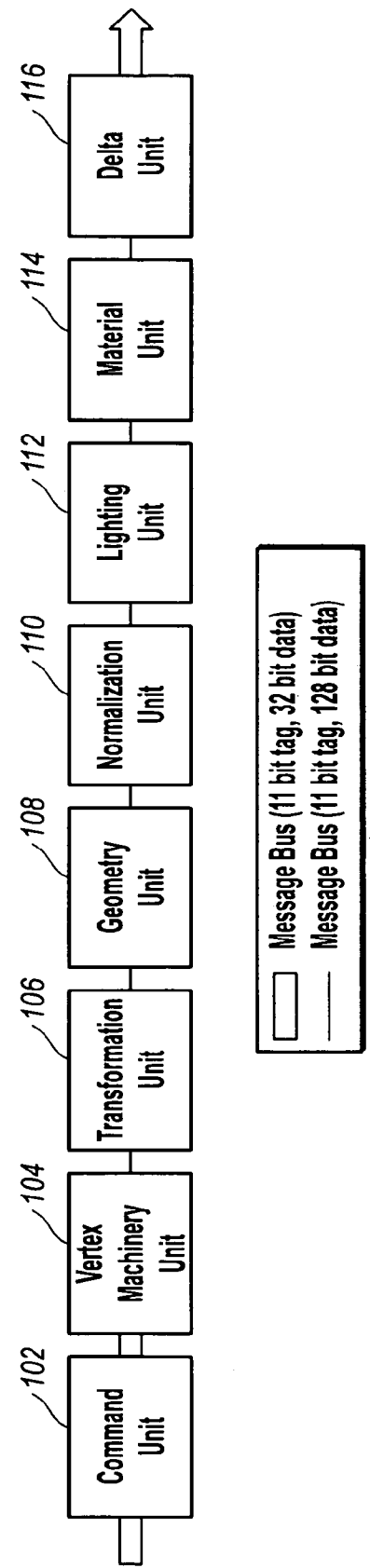
FIG. 1 depicts a functional block diagram of the preferred system.
Figure 2:
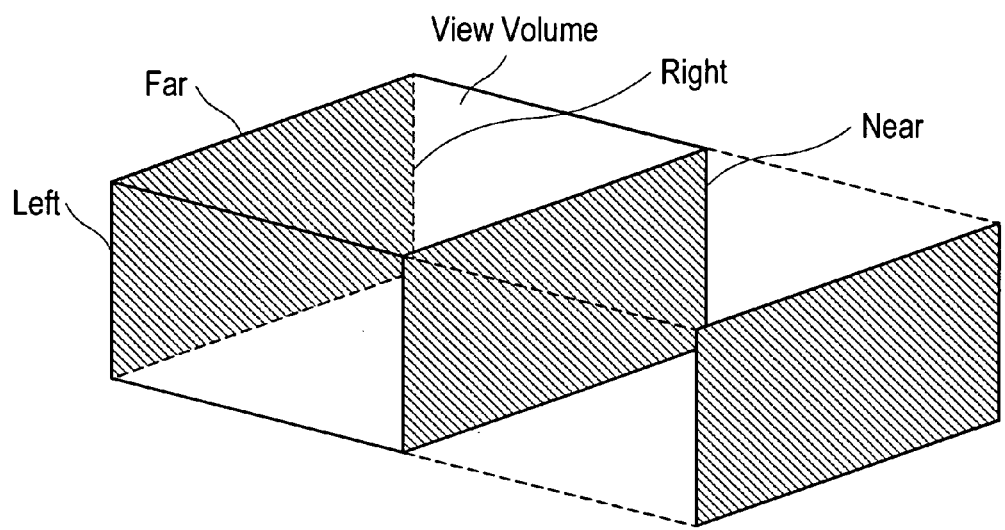
FIG. 2 depicts a parallelepiped.

A functional block diagram of the preferred system is shown in FIG. 1. This figure shows the core of the GAMMA architecture. The GAMMA architecture is based on a message passing paradigm. In this system all the processing units are connected in a long pipeline with communication with the adjacent units being accomplished through message passing. Between each unit there is a small amount of buffering, the size being specific to the local communications requirements and speed of the two units.

The message rate is variable and depends on the rendering mode. The messages do not propagate through the system at a fixed rate typical of a more traditional pipeline system. If the receiving unit cannot accept a message because its input buffer is full the sending unit stalls until space is available.

The message structure is fundamental to the whole system as the messages are used to control, synchronize and inform each unit about the processing it is to undertake. Each message has two fields—a data field and a tag (command) field. The data field will hold color information, coordinate information, local state information, etc. The tag field is used by each block to identify the message type so it knows how to act on it. The GAMMA architecture has a message bus with an 11 bit tag width and a 128 bit data width. The large data width allows a 4 component coordinate or color to be transferred between units in a single cycle.

The GAMMA architecture employs lazy evaluation. That is, effort is only spent calculating a parameter that is actually needed. This is especially true with lighting calculations. Lighting calculations require multiple vertices in order to determine backface orientation. Therefore, lighting is deferred until after primitives which will not be displayed are clipped out. In the same manner, texture, fog, and other parameter calculations that are necessary only for display purposes are deferred until after clipping has been performed.

The Command Unit 102 performs direct memory access (DMA) functions required by the GAMMA accelerator. In addition to DMA functions, the Command Unit 102 implements circular buffering. Circular buffering allows the DMA controller to treat a region of memory as a first in first out (FIFO) structure.

The Vertex Machinery Unit 104 expands Open GL commands and their subsequent vertices in order that the rest of the units in the pipeline can operate within the message paradigm.

Figure 3:
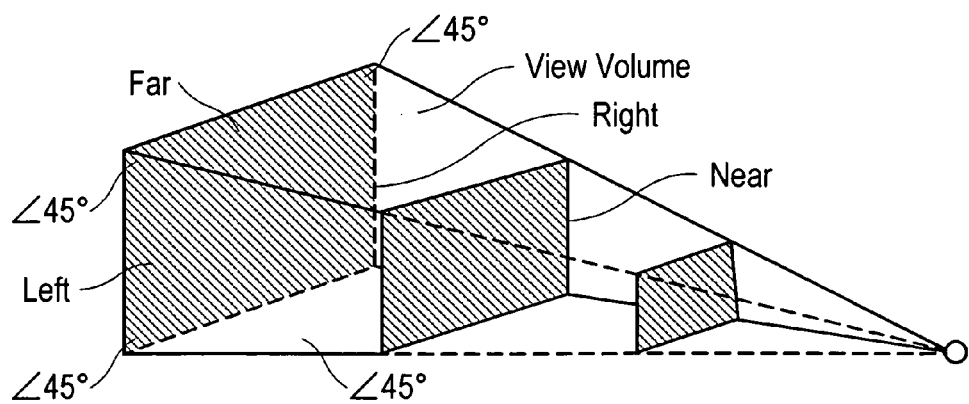
FIG. 3 depicts a frustrum.

The function of the Transformation Unit 106 is to transform the coordinates of vertices, normals, or texture coordinates for use by the successive units. Transformation of the coordinates can include translation, rotation, and modification of coordinate space (eye space, normalised device coordinates, etc.). The Transformation Unit 106 contains space for both 3D and 2D coordinate transformations. In the presently preferred embodiment, the Transformation Unit 106 transforms incoming coordinates into a special clipping space. This clipping space is defined by a viewing frustrum with sides at 45 degrees, as depicted in FIG. 3. The angle of the sides of the viewing frustrum enables easier calculation of primitive intersections. Once the coordinates have been transformed to the special clipping space, each vertex in the triangle primitive is assigned a fixed barycentric coordinate: (1,0,0), (0,1,0), (0,0,1).

The Geometry Unit 108 takes incoming vertices and calculates outcodes (for clipping) and projected window coordinates. Clipping of most primitives is performed here. Calculations such as lighting, fog, and texture are deferred until after the Geometry Unit 108 in order to allow the clip test to take place, saving processing time further down the pipeline.

The Normalization Unit 110 transforms and normalises normals once the clip test and backface culling have demonstrated they are definitely needed for the lighting calculations.

The Lighting Unit 112, under the direction of the Geometry Unit 108, evaluates the lighting equations for a vertex and sends the ambient, diffuse, and specular light values to the Material Unit 114. Although only one Lighting Unit 112 is shown, several such units can be cascaded together to improve performance for multiple lighting graphics.

The Material Unit 114, also under the direction of the Geometry Unit 108, combines calculated light values with material properties, such as diffuse reflectance coefficient, to determine the color of a vertex.

The Delta Unit 116 calculates triangle and line set up parameters when the rasterizer chip is incapable of such calculations.

A Day in the Life of a Lit Triangle Mesh

Before we get too detailed in how improved clipping is performed, it is worth while looking in general terms at how a primitive (e.g. triangle) passes through the GAMMA pipeline, what messages are generated, and what happens in each unit, particularly the Geometry Unit 108 of the presently preferred embodiment. Some simplifications have been made in the description to avoid detail which would otherwise complicate what is really a very simple process.

The mesh we are going to follow through GAMMA has three fogged Gouraud shaded triangles in it. The first triangle will be trivially clipped out, the second triangle will need to be clipped and the third triangle is totally in view. Backface culling is enabled but no culling is done. The mesh has the following OpenGL Format:

Begin (TriangleStrip)
Normal
Vertex
Normal
Vertex
Normal
Vertex

Normal
Vertex
Normal
Vertex
End

All other states are assumed to be set up.

In the interest of brevity only a single Lighting Unit 112 has been assumed in the following description.

On receiving the Begin message the Vertex Machinery Unit 104 initializes an internal state so it can track the individual triangles which make up the mesh and their alternating orientation. Next, it tells the Geometry Unit 108, Normalization Unit 110, Lighting Unit 112, and Material Unit 114, using the NextVertex (0) message, that the next vertex is to go in vertex store 0. The vertex stores cannot be addressed individually by messages as in the Delta Unit 116. Finally the Begin message is sent to all units, so they can do any other house keeping necessary.

Vertex 1

The Normal values are received via the Nx, Ny and Nz messages and the Vertex Machinery Unit 104 collects the individual components together and passes them collectively in the Normal message to the next unit. The individual vertex components (in the Vx, Vy, Vz and Vw messages) are collected together in a similar way and sent to the next unit in the Vertex message. The internal state is updated to record the first vertex has passed through and the NextVertex message sent to direct the next vertex to go into vertex store 1.

In the Transformation Unit 106 the Normal message causes matrix multiplication on the data field using the internal NormalMatrix. The result is saved internally (in case it is needed for texture coordinate generation) and forwarded on. The Vertex message causes the vertex data to be transformed by the ViewModelMatrix and the result sent in the EyeVertex message. The eye vertex is then transformed again by the ProjectionMatrix and this is sent in the ProjVertex message. The Transformation Unit 106 does not have a vertex store so ignores the NextVertex message.

In the Geometry Unit 108 the Normal message flows through and the eye vertex and projected vertices are both entered into the vertex store. The EyeVertex message is passed on to the Lighting Unit 112. The arrival of the ProjVertex message causes the outcode for the vertex to be calculated and entered into the vertex store. The outcodes are used for clip testing and to direct the clipping operation, if needed. The window coordinates are used for backface culling. The window coordinate calculations are deferred as the vertex is out of view. The NextVertex message advances the vertex pointer to the indicated vertex store in preparation for the next batch of vertex related data. It also resets some state management bits for the new vertex which keep track of what parameters have been calculated for it.

In the Normalization Unit 110 the Normal message updates the current normal register. The arrival of the ProjVertex message will update the appropriate vertex store (as previously set up by the NextVertex message) and set some state management variables. The Projvertex is passed on to the Lighting Unit 112.

The eye vertex is entered into the vertex store. The arrival of the ProjVertex message resets some state management bits for the vertex which keep track of what color(s) have been calculated for it. The NextVertex message advances the vertex pointer to the indicated vertex store in preparation for the next batch of vertex related data.

Vertex 2

The normal and vertex data is processed by the Vertex Machinery Unit 104, the Transformation Unit 106, Geometry Unit 108, Normalization Unit 110, Lighting Unit 112, and Material Unit 114 as previously described. The NextVertex message increments onto the next location in the vertex store.

Vertex 3

The normal and vertex data is processed as previously described. This time the Vertex Machinery Unit 104 has detected that enough vertices are present for a triangle, so it sends a GeomTriangle message followed by the NextVertex message. The vertex store location for the next vertex has been set back to zero (and will continue to cycle between 0, 1 and 2 for the duration of the triangle strip).

The GeomTriangle message passes through the Transformation Unit 106 with no effect and when it reaches the Geometry Unit 108 it starts the triangle processing. The first thing the triangle processing does is to check if the triangle can be trivially rejected. It does this by testing the three outcodes previously calculated and for this triangle the result is 'not visible' so the processing ends here.

Vertex 4

The normal and vertex data is processed as previously described. Now that one triangle has been processed each new vertex forms a new triangle so the Vertex Machinery Unit 104 sends a GeomTriangle message and then the NextVertex message. The vertex store location is incremented to 1.

The GeomTriangle message passes through the Transformation Unit with no effect and when it reaches the Geometry Unit 108 it starts the triangle processing. Note this time the new vertex has been added to the two left over from the previous triangle. The outcode test now shows that the triangle is partially in view and, consequently, needs to be clipped. Before clipping is done, any outstanding window coordinates are calculated (all three in this case) so that the "area" of the triangle can be determined and the backface orientation tested. The sign of the "area" indicates the orientation. No culling is done so in a last ditch attempt to avoid clipping the area is tested against a threshold value. For a small triangle it is faster to rasterize and scissor the excess area rather than do a full clip. This test is only done if near, far, or user clipping planes are not cut by the triangle. The triangle is clipped and the barycentric centric coordinates of the intersection points are calculated. The full clipping operation may have shown the triangle to be out of view in which case no intersections would have been calculated and processing ends here.

The triangle is to be fogged so each vertex is tested to see if the fog value has already been calculated. In this example no vertex has reached this stage of processing before so the fog calculation is done for all vertices.

The clipped triangle is likely to be a polygon so it is broken up into a fan of triangles and the parameters in the Delta Unit 116 tracked accordingly. The clipped triangle's vertices are either original vertices or intersection vertices defined by their barycentric coordinate. Original vertices have their fog and window coordinates sent to the Delta Unit 116 and the VertexColour message sent to the Normalization Unit 110, Lighting Unit 112, and Material Unit 114 to initiate the lighting calculations. The intersection vertices need to have their fog and window coordinates calculated first. Also the intersection vertices have their barycentric coordinates sent to the Material Unit 114 in the Barycentric message and the ClippedColour message is sent to initiate the intersection color to be calculated by the Material Unit 114. In this example, the first vertex is an intersection vertex. After enough data has been sent for the triangle, a RenderTriangle message is sent to notify the Delta Unit 116 that the triangle is ready to have its set up calculations done and be drawn.

The Normalization Unit 110, on receiving the VertexColour message, will normalize (if enabled) any outstanding normals and send them to the Lighting Unit 112. This is the first time, in this example, that the processing has reached the Normalization Unit 110 so all three normals will be processed.

The Lighting Unit 112 on receiving the Normal message will store the normal data in the indicated vertex store (encoded in the message tag). The VertexColour message causes the three vertex stores (holding the original triangle normal and eye vertex data) to be tested to see if the light values for theses vertices has already been calculated. In this example, this will not be the case as this is the first time the processing has reached the Lighting Unit 112. The light values (ambient, diffuse, and specular) for each vertex are calculated using the lighting equations and sent to the Material Unit 114 in the AmbientLight, DiffuseLight, and specular Light messages respectively. The target vertex store for these messages is encoded in the message tag.

The Material Unit 114 on receiving the AmbientLight, DiffuseLight, and Specular Light messages just stores the values in the corresponding vertex store location. The VertexColour message causes the three vertex stores (holding the light data) to be tested to see if the color values for these vertices has already been calculated. This will not be the case, in this example, as this is the first time the processing has reached the Material Unit 114. The color value for each vertex is calculated and sent to the Delta Unit 116 in the DeltaColour message. The target vertex store for these messages is encoded in the message tag.

The next message the Material Unit 114 receives is the Barycentric message so the barycentric coordinates are stored until later. The ClippedVertex message instructs the Material Unit 114 to calculate the color at the barycentric coordinate using the identified three original vertex colors and send it to the given vertex store in the Delta unit 116. Sending a clipped color to the Delta Unit 116 will invalidate the vertex color previously held in this vertex store so a subsequent VertexColour message referencing this vertex store will cause the clipped color in the Delta Unit 116 to be replaced by the vertex color.

The Delta Unit 116 has been receiving the window coordinate, color, and fog data for each vertex in the triangle which it stores in its vertex store. When the RenderTriangle message is received the parameters required by a graphics accelerator or other rendering hardware, to render the triangle are calculated and sent. In the presently preferred embodiment, GLINT™, a high performance graphics processor which combines workstation class 3D graphics acceleration, and state-of-the-art 2D performance in a single chip, is used in combination with GAMMA to render the primitive. Finally the Render message initiates the triangle rendering in the graphics accelerator.

The remaining triangle generated by the clipping operation is processed in a similar way. Note that no new lighting or material calculations are done.

Vertex 5

The normal and vertex data is processed as previously described. The Vertex Machinery Unit 104 sends a GeomTriangle message and then the NextVertex message. The vertex store location is incremented to 2.

The GeomTriangle message passes through the Transformation Unit 106 with no effect and when it reaches the Geometry Unit 108 it starts the triangle processing. Note, this time the new vertex has been added to the two left over from the previous triangle. The outcode test shows that the triangle is totally in view and, consequently, doesn't need to be clipped. The new vertex has it's window coordinates calculated. The area of the triangle is calculated (from the window coordinates) and the backface orientation tested. No culling is done. The triangle is to be fogged so each vertex is tested to see if the fog value has already been calculated. In this example the earlier two vertices have already had their fog calculation done the calculation is performed only for the new vertex. As the previous triangle was clipped, any retained state in the Delta Unit 116 is considered unreliable. The vertex information (window coordinates and fog) for each vertex in this triangle is sent. A VertexColour message is also sent to cause the Normalization Unit 110, Lighting Unit 112, and Material Unit 114 to calculate the color for the new vertex. Finally, a DrawTriangle message is sent.

The VertexColour message causes the Normalization Unit 110 to examine all three normals and to normalize (if enabled) those which haven't been done. Any new normals are sent to the Lighting Unit 112. Only the new normal falls into this category so it is processed as outlined immediately above.

The VertexColour message causes the Lighting Unit 112 to examine all three vertices and to light those without valid colors. Only the new vertex falls into this category and so its lighting calculations are performed and the light values sent to the Material Unit 114.

The VertexColour message causes the Material Unit 114 to examine all three vertices and to color those without valid colors. Only the new vertex falls into this category and has the material calculations performed for it. As the previous triangle was clipped, no retained colors in the Delta Unit 116 can be relied on so all three colors are sent to the Delta Unit 116.

The Delta Unit 116 has been receiving the vertex window coordinate, color and fog data for each vertex in the triangle which it stores in the vertex stores. When the DrawTriangle message is received, the parameters required by the graphics accelerator, GLINT™ in the presently preferred embodiment, to render the triangle are calculated and sent. Finally, the Render message initiates the triangle rendering in the graphics accelerator.

The final message sent by the host is the end message. In the case of a TriangleStrip this does nothing. However, for a Polygon or LineLoop, this message causes the last triangle or line segment to be drawn.

Behavioural Model

The following pseudo-code describes the operation of the disclosed clipping process in its presently preferred embodiment. Of course, many other implementations which express the operation of the clipping process can exist. The code below merely provides an example and is not meant to limit the disclosed clipping process in scope or embodiment in any way.

```
enum {  eNulltoken,        ePassThroughToken    = 0x44e00000,
                           ePointToken          = 0x44e02000,
                           eLineToken           = 0x44e04000,
                           eTriangleToken       = 0x44e06000,
                           eRectangleToken      = 0x44e08000,
                           eLineResetToken      =
0x44e0e000}, enum {      e2D,    e3D,    e3DColour,    e3DColourTexture,
e4DColourTexture    };

enum {  eLeft, eRight, eBottom, eTop, eNear, eFar,
        eU0, eU1, eU2, eU3 eU4, eU5  };

Struct VertexStore

{
    Vec4    coord;
    Vec3    window;
    Float   invW;
    Vec4    eye;
    Vec4    texture;
    Float   fog;
    int12   outcode;
    bool    hasParameters;
    bool    hasWindowCoords;
    bool    sentParameters;
};

Struct RasterPosData
{
    Vec3    window;
    Float   eyeZ;
    Float   w;
    Vec4    texture;
    Float   fog;
```

```
    bool    inView;
    Float   xIncrement;
    Float   yIncrement;
    Float   xOffset;
    Float   yOffset;
};

// Global State variables

VertexStore     V[4];
RasterPosData   rasterPos;

Vec4        userClipPlane[6];
Vec3        viewPortScale;
Vec3        viewPortOffset;
Float       faceNormalZ;
Vec4        texture;

// Clipping control
Float       lineClipLengthThreshold;
Float       triangleClipAreaThreshold;

// Mode flags.
GeometryMode    mode;
bool        textureEnable;
bool        fogEnable;
int2        polyMode;

// Fog data.
Float       fogDensity;
Float       fogEnd;
Float       fogScale;           // holds 1.0 / (fogEnd
- fogStart)'

Float       polygonOffsetFactor;
Float       polygonOffsetBias;

// Internal data
int2        vertex;
```

```
bool        haveFaceNormal;
bool        frontFacing;

// Variables used in Select mode
const int7      kMaxStackDepth = 64;
bool        hitFound;
bool        stackOverflow;
bool        stackUnderflow;
bool        invalidOperation;
Float           selectMinZ;
Float           selectMaxZ;
int32           nameStack[kMaxStackDepth];
int7        namesOnStack;
```

// Variables used in clipping. These don't need to be part of the context
// save and restore as they are transient and are only valid during
// clipping.
```
int12           runningOutcode;
int5        vertexCount;
int4        inVertex;
int4        outVertex;
int5        clipVertexCount;
int2        a, b, c; // tracks original 3 vertices during clipping.
Float           clipZOffset;

on reset
{
}
```

// This function clips the line as if it were an edge of the triangle by
// using the same clipping function as the triangle code does. This is
// quite wasteful of cycles as the barycentric coordinates could be // replaced by a single parametric value, however as clipped lin
// performance is not important this is the easiest way to implement line
// clipping.

```
void ClipLine (int2 start, int2 end, int2 provokingVertex)
{
   int4    plane;

a = start;
   b = end;
   c = end;          // not used

// Copy the two input vertices into the clip buffer
   clipBuffer[0].barycentric = Vec3 (1.0, 0.0, 0.0);
   clipbuffer[0].outcode = V[start].outcode;
   clipBuffer[0].edgeFlag = true;

clipbuffer[1].barycentric = Vec3 (0.0, 1.0, 0.0);
   clipbuffer[1].outcode = V[start].outcode;
   clipBuffer[1].edgeFlag = true;

// Accumulate a running OR outcode so this can be used to determine
   // which planes need to be clipped against.
     runningOutcode    =    clipBuffer[0].outcode   |  clipBuffer[1].outcode;
   inVertex = 0;
   outVertex = 2;
   clipVertexCount = 2;

for (plane = 0; plane < kNumberOfClippingPlanes; plane++)
        ClipAgainstPlane (plane, false);

if (clipVertexCount < 2)

// Every thing has been clipped out (clipVertexCount
```

```
== 0) or
    // something has gone wrong and too few output
vertices have
    // been generated.  Recall the first vertex is
duplicated at the end
    // to simplify clipping.

return;
}

// Cause the Lighting Unit to send the front colour for
the start and
// end vertices.
SednVertexColour (true, start, true, end, false, 0,
                  provokingVertex,    true,
mode.flatShading,
                  false);

CheckCalculateParameters (start);
CheckCalculateParameters (end);

clipZOffset = 0.0;

SubmitClipBufferLines (2, provokingVertex, true,
                       mode.FlatShading);

// This routine clips a polygon against the 3d viewing
frustrum and up to 6
// user clip planes.
// The algorithm used is the Sutherland and Hodgman
Polygon clipper.
// this clipper clip the whole polygon against each
clipping plane in
// turn.  The new output polygon is submitted tot he next
clipping plane
// and so on.  the intermediate partially clipped polygons
are held in a
// circular buffer with the original and generated
vertices defined by
```

// their barycentric coordinates.

```
void ClipTriangle (int2 provokingVertex, int2 ta, int2 tb, int2 tc,
                   bool edgeA, bool edgeB, bool edgeC)
{
   int4    plane;
   int2    result;

// Note the a, b and c variables are globals used by the clipping
   // routines so they know what the three original vertices are.
   a = ta;
   b = tb;
   c = tc;

// Copy the three input vertices into the clip buffer and duplicate
   // the first vertex so the three edges are fully defined without having
   // to treat the last edge as something special.

clipBuffer[0].barycentric = Vec3 (1.0, 0.0, 0.0);
   clipBuffer[0].outcode = V[a].outcode;
   clipBuffer[0].edgeFlag = edgeA;

clipBuffer[1].barycentric = Vec3 (0.0, 1.0, 0.0);
   clipBuffer[1].outcode = V[b].outcode;
   clipBuffer[1].edgeFlag = edgeB;

clipBuffer[2].barycentric = Vec3 (0.0, 0.0, 1.0);
   clipBuffer[2].outcode = V[c].outcode;
   clipBuffer[2].edgeFlag = edgeC;

clipBuffer[3].barycentric = Vec3 (1.0, 0.0, 0.0);
   clipBuffer[3].outcode = V[a].outcode;
   clipBuffer[3].edgeFlag = edgeA;
```

```
    // Accumulate a running OR outcode so this can be used
to determine
    // which planes need to be clipped against.
    runningOutcode    =    clipBuffer[0].outcode     |
clipBuffer[1].outcode |
                    clipBuffer[2].outcode;
    inVertex = 0;
    outVertex = 4;
    clipVertexCount = 4;

for (plane = 0; plane < kNumberOfClippingPlanes;
plane++)
        ClipAgainstPlane (plane, true);

if (vertexCount < 4)
    {
        // Every thing has been clipped out (clipVertexCount
== 0) or
        // something has gone wrong and too few output
vertices have
        // been generated.  Recall the first vertex is
duplicated at the end
        // to simplify clipping.
        return;
    } clipZOffset = 0.0;

if ((V[a].outcode | V[b].outcode | V[c].outcode) & (1
<< eNear) != 0)
    {
        // The triangle crossed the near plane so area,
facing direction,
        // backface culling and polygon offset (if needed)
are calculated
        // from the clipped triangle data.

if (ClippedTriangleCullAndPolygonOffset ())
            return;    // culled.
```

```
    }
  else
  }
    // Set up the window coordinates for the polygon
offset.
    if (mode.PolygonOffsetPoint || mode.PolygonOffsetLine ||
        mode.PolygonOffsetFill)
    {
      CheckCalculateParameters (a);
      CheckCalculateParameters (b);
      CheckCalculateParameters (c);
    } if (frontFacing)
        polyMode = mode.FrontPolyMode;
    else
        polyMode = mode.BackPolyMode;

// Handle any polygon offset.
    switch (polyMode)
    {
      ePolyModePoint:
            if (mode.PolygonOffsetPoint)
                clipZOffset = CalculatePolygonOffset (a, b, c);
            break;

ePolyModeLine:
            if(mode.PolygonOffsetLine)
                clipZOffset = CalculatePolygonOffset (a, b, c);
            break;

ePolyModeFill:
            if (mode.PolygonOffsetFill)
                clipZOffset = CalculatePolygonOffset (a, b, c);
            break;
```

```
      }
   }

// Cause the Lighting Unit to send the colour all the triangle
   // vertices

SendVertexColour  (true,   a,   true,   b,   true,   c,
provokingVertex,
                              frontFacing,   mode.FlatShading,
false);

switch (polyMode)
   {
     ePolyModePoint:
              // Don't use the last vertex as it is a repeat of the first.
              SubmitClipBufferPoints (clipVertexCount - 1,
                                            provokingVertex,
frontFacing,
                                            mode.FlatShading);
              break;

ePolyModeLine:
              SubmitClipBufferLines (clipVertexCount,
                                            provokingVertex,
frontFacing,
                                            mode.FlatShading);
              break;

ePolyModeFill:
              SubmitClipBufferTriangles (clipVertexCount,
                                            provokingVertex,
frontFacing,
                                            mode.FlatShading);
              break;
   }
}
```

```
// Check the orientation of the triangle.  If it is to be
culled then true
// is returned.  The front facing status of the triangle
is passed
// back in bit 1.  the clipZOffset is calculated if
needed.  Note that only
// the first triangle in the clip buffer is tested.  This
is not expected
// to be a degenerate triangle.

bool ClippedTriangleCullAndPolygonOffset (void)
{
   bool  ccw;
   Vec3  A, B, C, dAC, dBC;
   Float area, oneOverArea;
   Float t1, t2, t3, t4;
   Float dzdx, dzdy, maxdz;

// Calculate the window coordinates for the first
triangle in the
   // clip buffer.
   A = ClippedWindowCoord (inVertex);
   B = ClippedWindowCoord ((inVertex + 1) & 0xf);
   C = ClippedWindowCoord ((inVertex + 2) & 0xf);

// Calculate the area of triangle.
   dAC = A - C;
   dBC = B - C;
   area = dAC.x * dBC.Y - dBC.x * dAC.y;

// We should never have a zero area triangle here,
however a degenerate
   // triangle when polymode is lines or points is
possible.
      if (area == 0.0 && mode.FrontPolyMode == dPolyModeFill)
         return true;           // Cull;

if (area >= 0.0)
         ccw = true;
```

```
else
  ccw = false;

if (!(mode.CullUsingFaceNormal && haveFaceNormal))
{
  if (mode.FrontFaceDirection == eCCW)
      frontFacing = ccw;
  else
      frontFacing = !ccw;

if (mode.PolygonCull &&
        ((mode.PolygonCullFace == eFrontAndBack) ||
        ((mode.PolygonCullFace    ==    eFront)    &&
frontFacing) ||
        ((mode.PolygonCullFace    ==    eBack)    &&
!frontFacing)))
    {
      // Cull polygon.
      return true;    // Cull
    }
} if (frontFacing)
      polyMode = mode.FrontPolyMode;
  else
      polyMode = mode.BackPolyMode;

// Handle any polygon offset.
    if    (((polyMode    ==    ePolyModePoint)       &&
mode.PolygonOffsetPoint) ||
        ((polyMode    ==    ePolyModeLine)    &&
mode.PolygonOffsetLine ||
        ((polyMode    ==    ePolyModeFill)    &&
mode.PolygonOffsetFill))
    {
      oneOverArea = 1.0 / area;

t1 = dAC.y * oneOverArea;
      t2 = dBC.y * oneOverArea;
```

```
      t3 = dAC.x * oneOverArea;
      t4 = dBC.x * oneOverArea;

dzdx = Abs (dAC.z * t2 - dBC.z * t1);
      dzdy = Abs (dBC.z * t3 - dAC.Z * t4);

if (dzdx > dzdy)
         maxdz = dzdx;
      else
         maxdz = dzdy;

clipZOffset = polygonOffsetFactor * maxdz +
PolygonOffsetBias;
      } return false;         // No cull
}

// Calculate the window coordinates for the given clipped
vertex.

Vec3 ClippedWindowCoord (int4 v)
{
   Vec3 u, barycentric;
   Float w, invw;

Barycnetric = clipBuffer[v].barycnetric;
   w = DotS (V[a].coord.w, V[b].coord.w, V[c].coord.w,
barycentric);
   invW = (Float) 1.0 / w;

u.x = DotS(V[a].coord.x, V[b].coord.x, V[c].coord.x,
barycentric);
   u.y = DotS(V[a].coord.y, V[b].coord.y, V[c].coord.y,
barycentric);
   u.z = DotS(V[a].coord.z, V[b].coord.z, V[c].coord.z,
barycentric);

// perspective projection and viewport mapping.
```

```
u = u * invW;
u = u * viewPortScale + viewPortOffset;

return u;
} void SubmitClipBufferPoints (int5 clipVertexCount,
                             int4    provokingVertex,    int frontFacing,
                             bool useProvoking)
{
   int5 i;

for (i = 0; i < clipVertexCount; i++)
   {
      if (clipBuffer[inVertex].edgeFlag
      {
         switch (mode.RenderMode)
         {
           case eRender:
                SendClippedVertex    (inVertex,    0, provokingVertex,
                                                    frontFacing,
useProvoking);
                renderPrimData = 0;
                renderPointData.a = 0;
                renderPrimData.frontFacing = frontFacing;
                renderPrimData.provokingVertex    = provokingVertex;
                renderPrimData.useProvokingVertex    = useProvoking;
                SendMessage    (RenderPoint_Tag, renderpointData);
                break;

case eSelect:
                SelectClippedVertex (inVertex):
                break;
```

```
            case eFeedback:
               FeedbackClippedVertex    (ePointToken,
inVertex,
                                          provokingVertex,
frontFacing,
                                          useprovoking);
               break;
         }
      }
      inVertex = (inVertex + 1) & 0xf;
   }
}

// No use is made of shared vertices between successive line segments to
// keep thing simple as peak performance is not important here.
// We make no attempt to get clipped stippled lines to work here
// as OpenGL does not guarantee any stipple behaviour for clipped lines.

void SubmitClipBufferLines (int5 clipVertexCount,
                     int2    provokingvertex,    bool frontFacing,
                     bool useProvoking)
{
   int5  i;
   bool  resetLineStipple = true;

// Line count is one less than vertex count.
   for (i = 1; i < clipVertexCount: i++)
   {
      if (clipBuffer[inVertex].edgeFlag)
      {
         switch (mode.RenderMode)
         {
            case eRender:
               SendClippedVertex    (inVertex,    0,
```

```
                provokingVertex,
                                           frontFacing,
useProvoking);
                SendClippedVertex ((inVertex + 1) & Oxf, 1,
                                           provokingVertex,
frontFacing,
                                           useProvoking);
                renderPrimData = 0;
                renderPrimData.a = 0;
                renderPrimData.b = 1;
                renderPrimData.resetLineStripple   =
resetLineStipple;
                renderPrimData.frontFacing = frontFacing;
                renderPrimData.provokingVertex   =
provokingVertex;
                renderPrimData.useProvokingVertex   =
useProvoking;
                SendMessage (RenderLine_Tag, renderPrimData
);
                break;

case eSelect:
                SelectClippedVertex (inVertex);
                SelectClippedVertex (inVertex + 1);
                break;

case eFeedback:
                FeedbackClippedVertex     (eLineToken,
inVertex,
                                           provokingVertex,
frontFacing,
                                           useprovoking);
                FeedbackClippedVertex (eNullToken, inVertex
+ 1,
                                           provokingVertex,
frontFacing,
                                           useProvoking):
                break;
        }
```

```
         }
         inVertex = (inVertex + 1) & Oxf;
         resetLineStipple = false;
      }
}

// No use is made of shared vertices between successive
triangles segments
// (in a fan) to keep things simple as peak performance is
not important
// here.

void SubmitClipBufferTriangles (int5 clipVertexCount,
int2 provokingVertex, bool frontFacing,
                                   bool useProvoking)
{
   int5   i;
   int4   startVertex = inVertex;

// Triangle count is three less than vertex count.
Note keep
   // startVertex as the anchor vertex when the polygon is
drawn as a fan
   // of triangles.
   for (i = 3; i < clipVertexCount; i++)
   {
      switch (mode.RenderMode)
      {
         case eRender:
            SendClippedVertex    ( startVertex, 0,
provokingVertex,
                                            frontFacing,
useProvoking);
            SendClippedVertex ((inVertex + 1) & Oxf, 1,
                                       provokingVertex,
frontFacing,
                                       useProvoking);
            SendClippedVertex ((inVertex + 2) & Oxf, 2,
                                       provokingVertex,
```

```
                    frontFacing,
                                            useProvoking);
            renderPrimData = 0;
            renderPrimData.a = 0;
            renderPrimData.b = 1;
            renderPrimData.c = 2;
            renderPrimData.frontFacing = frontFacing;
            renderPrimData.provokingVertex    =
provokingVertex;
            renderPrimData.useProvokingVertex =
useProvoking;
            SendMessage    (RenderTriangle_Tag,
renderPrimData );
            break;

case eSelect:
            SelectClippedVertex (startVertex);
            SelectClippedVertex (inVertex + 1);
            SelectClippedVertex (inVertex + 2);
            break;

case eFeedback:
            FeedbackClippedVertex     (eTriangleToken,
startVertex,
                                            provokingVertex,
frontFacing,
                                            useProvoking);
            FeedbackClippedVertex (eNulltoken, inVertex
+ 1,
                                            provokingVertex,
frontFacing,
                                            useProvoking);
            FeedbackClippedVertex (eNullToken, inVertex
+ 2,
                                            provokingVertex,
frontFacing,
                                            useProvoking);
            break;
    }
```

```
        inVertex = (inVertex + 1) & 0xf;
    }
}

// this function clips the contents of the clip buffer against the
// selected plane if any vertices straddle the plane. the results are
// written back into the circular buffer.

void ClipAgainstPlane (int4 plane, bool isTriangle)
{
    int12  planeMask = 1 << plane;
    int4   i, s, p, outVertexCount, firstVertex;
    bool   sInside, pInside;

if ((plane >= eU0) && (mode.UserClipmask & (1 << (plane - eU0)) ==0))
        return;    // user clipping plane not enable.

if (runningOutcode & planeMask == 0)
    {
      // all vertices are on the visible side of the plane so
      // no clipping against this plane is necessary.
      return;
    } if (clipVertexCount == 0)
      return;    // nothing to clip.

// Clip the vertices against the selected clipping plane.
    outVertexCount = 0;
    runningOutcode = 0;
    firstVertex = outVertex;

for (i = 0; i < clipVertexCount - 1; i++)
    {
```

```
    s = inVertex;
    p = (inVertex + 1) & 0xf;

if (clipBuffer[s].outcode & planeMask == 0)
        sInside = true;
    else
        sInside = false if (clipBuffer[p].outcode & planeMask == 0)
        pInside = true;
    else
        pInside = false if (sInside && pInside)
    {
        // output P.
        clipBuffer[outVertex] = clipBuffer[p];         /
structure copy
        outVertex = (outVertex + 1) & 0xf;
        outVertexCount++;
        runningOutcode |= clipBuffer[p].outcode;
    } if (sInside && !pInside)
    {
        // Output the intersection point.  Note that the
intersection is
        // calculated from the outside vertex to the
inside vertex for
        // consistency.
        CalculateIntersection (p, s, outVertex, plane);
        clipBuffer[outVertex].edgeFlag = true;
        runningOutcode |= clipBuffer[outVertex].outcode;
        outVertex = (outVertex + 1) & 0xf;
        outVertexCount++;
    } if (!sInside && pInside)
    {
```

```
      // Output intersection point and P.  Note that the intersection is
      // calculated from the outside vertex to the inside vertex for
      // consistency.
        CalculateIntersection (s, p, outVertex, plane);
          clipBuffer[outVertex].edgeFlag    = clipBuffer[s].edgeflag;
        runningOutcode |= clipBuffer[outVertex].outcode;
        outVertex = (outVertex + 1) & Oxf;
        outVertexCount++;
        clipBuffer[outVertex] = clipBuffer[p];          / structure copy
        outVertex = (outVertex + 1) & Oxf;
        outVertexCount++;
        runningOutcode |= clipBuffer[p].outcode;
      } if (!sInside && !pInside)
      {
          // Drop the first vertex.
      } inVertex = (inVertex + 1) & Oxf;
    }

// Close the buffer with the first vertex.
    if (isTriangle)
    {
      clipBuffer[outVertex] = clipBuffer[firstVertex];
      outVertex = (outVertex + 1) & Oxf;
      outVertexCount++;
    }
    else
    {
      // We have been doing line clipping.
      if (sInside)
      {
         clipBuffer[outVertex] = clipBuffer[s];
```

```
            runningOutcode |= clipBuffer[s].outcode;
            outVertex = (outVertex + 1) & 0xf;
            outVertexCount++;
        }
        else
        {
            // Vertex is already copied (case 'pInside &&
!sInside' above).
        }
    }

// Update the global state.
    inVertex = (inVertex + 1) & 0xf;
    clipVertexCount = outVertexCount;
}

// This function calculates the intersection of a line
with a plane
// in 4D space.  the plane is selected by the plane symbol
and represents
// the following planes:
//
//        left      x = -w
//        right       x = +w
//        top       y = +w
//        bottom    y = -w
//        near      z = +w
//        far       z = -w
//
// If the line is expressed in parametric form then when
t = 0 the line is
// at point S and when t = 1 the line is at point p.  Once
t is found for
// the intersection point he coordinates (and colour or
other parameters)
// are easily interpolated using the equation:
//
//    Pi = S + t * (P - S)    where Pi = point of inter-
section
```

```
//
// on each component in turn.  The method of calculating
t is based on
// similar triangles and ratios.
//
//    t = |Pi - S| / (|Pi - S| + |Pi - S|)
//
// Noting that P and S are on different sides of the
clipping plane the
// equation can be written;
//
//    t = (Pi - S) / ((Pi - S) - (Pi - P))
//
// For the right clipping plane the distance (Pi - S) and
(Pi - P)
// can be replaced by the distances parallel to the w axis
so the
// equation is now
//
//    t = (Sx - Sw) / ((Sx - Sw) - (Px - Pw))
//
// Similar equations can be formulated for the other
clipping planes.

Void CalculateIntersection (int4 s, int4 p, int4 out, int4 plane)
{
    Float  t, S, Sw, P, Pw;
    int4   u;
    Vec3   sBarycentric, pBarycentric;
    Vec4   eyeS, eyeP;

switch (plane)
    {
      case eLeft:
           S  = GetX  (s);
           Sw = - GetW (s);
           P  = GetX (p);
           Pw = - GetW (p);
```

```
        break;

case eRight:
        S = GetX (s);
        Sw = GetW (s);
        P = GetX (p);
        Pw = GetW (p);
        break;

case eBottom:
        S = GetY (s);
        Sw = - GetW (s);
        P = GetY (p);
        Pw = - GetW (p);
        break;

case eTop:
        S = GetY (s);
        Sw = GetW (s);
        P = GetY (p);
        Pw = GetW (p);
        break;

case eNear:
        S = GetZ (s);
        Sw = - GetW (s);
        P = GetZ (p);
        Pw = - GetW (p);
        break;

case eFar:
        S = GetZ (s);
        Sw = GetW (s);
        P = GetZ (p);
        Pw = GetW (p);
        break;

}
```

```
if ((mode.UserClipMask != 0) && (plane >= eU0) &&
(plane <= eU5))
  {
    u = plane - eU0;
    eyeS = GetEye (s);
    eyeP = GetEye (p);

// Calculate the distance from the plane.
    S = Dot (eyeS, userClipPlane[u]);
    P = Dot (eyeP, userClipPlane[u]);

t= S / (S - P);
  }
  else
    t = (S - Sw) / ((S - Sw) - (P - Pw)):

// All intersections are stored as barycentric coordi-
nates so use t to
  // interpolate between these.

sBarycentric = clipBuffer[s].barycentric;
  pBarycentric = clipBuffer[p].barycentric;

clipBuffer[out].barycentric   =    (pBarycentric  -
sBarycentric) * t +
                                    sBarycentric;

CalculateBarycentricOutcode (out);
} void CalculateBarycentricOutcode (int4 s)
{
  Vec4  point, eye;
  Vec3 barycentric = clipBuffer[s].barycentric;

point.x   =   DotS   (V[a].coord.x,  V[b].coord.x,
V[c].coord.x, barycentric);
  point.y   =   DotS   (V[a].coord.y,  V[b].coord.y,
V[c].coord.y, barycentric);
```

```
    point.z  =  DotS   (V[a].coord.z,  V[b].coord.z,
V[c].coord.z, barycentric);
    point.w  =  DotS   (V[a].coord.w,  V[b].coord.w,
V[c].coord.w, barycentric);

if (mode.UserClipMask != 0)
    {
        eye.x = DotS  (V[a].eye.x,  V[b].eye.x,  V[c].eye.x,
barycentric);
        eye.y = DotS  (V[a].eye.y,  V[b].eye.y,  V[c].eye.y,
barycentric);
        eye.z = DotS  (V[a].eye.z,  V[b].eye.z,  V[c].eye.z,
barycentric);
        eye.w = DotS  (V[a].eye.w,  V[b].eye.w,  V[c].eye.w,
barycentric);
    } clipBuffer[s].outcode = CalculateOutcode (point, eye);
}

Vec4 GetEye (int4 s)
{
    Vec4  eye;
    Vec3 barycentric = clipBuffer[s].barycentric;

// Barycentric coordinate.
    eye.x = DotS  (V[a].eye.x,  V[b].eye.x,  V[c].eye.x,
barycentric);
    eye.y = DotS  (V[a].eye.y,  V[b].eye.y,  V[c].eye.y,
barycentric);
    eye.z = DotS  (V[a].eye.z,  V[b].eye.z,  V[c].eye.z,
barycentric);
    eye.w = DotS  (V[a].eye.w,  V[b].eye.w,  V[c].eye.w,
barycentric);

return eye;
}
```

```
Float GetX (int4 s)
{
   // Barycentric coordinate.
   return DotS (V[a].coord.x, V[b].coord.x, V[c].coord.x,
            clipBuffer[s].barycentric);
}

Float GetY (int4 s)
{
   // Barycentric coordinate.
   return DotS (V[a].coord.y, V[b].coord.y, V[c].coord.y,
            clipBuffer[s].barycentric);
}

Float GetZ (int4 s)
{
   // Barycentric coordinate.
   return DotS (V[a].coord.z, V[b].coord.z, V[c].coord.z,
            clipBuffer[s].barycentric);
}

Float GetW (int4 s)
{
   // Barycentric coordinate.
   return DotS (V[a].coord.w, V[b].coord.w, V[c}.coord.w,
            clipBuffer[s].barycentric);
}

// Note that the destination, d, cannot include vertex
store 3 in the Delta
// Unit.

void   SednClippedVertex   (int4   s,   int2   d,   int2
provokingVertex,
                        bool   frontFacing,   bool
useProvoking)
```

```
{
   Vec3   barycentric;
   float  f, eyeZ;
   Vec3   u;
   Vec4   v;
   Float  w, invW;

// Barycentric coordinate.
   barycentric = clipBuffer[s].barycentric;

// Colour.
   // Tell the lighting unit to calc the colour from the
barycentric
   // coord.
   SendVec3message (Barycentric_Tag, barycentric);
   SendClippedColourMessage  (a, b, c, provokingVertex,
frontFacing,
                              d, useProvoking);

w = DotS (V[a].coord.w, V[b].coord.w, V[c].coord.w,
barycentric);
   invW = (Float) 1.0 / w;

// Texture.
   if (mode.TextureEnable && textureEnable)
   {
      v.x  =  DotS    (V[a].texture.x,  V[b].texture.x,
V[c].texture.x,
               barycentric);
      v.y  =  DotS    (V[a].texture.y,  V[b].texture.y,
V[c].texture.y,
               barycentric);
      v.z  =  DotS    (V[a].texture.z,  V[b].texture.z,
V[c].texture.z,
               barycentric);
      v.w  =  DotS    (V[a].texture.w,  V[b].texture.w,
V[c].texture.w,
               barycentric);
      v = v * invW;
```

```
        SendVec4Message (DeltaTexture0_Ta + d, v);
    }

// Fog.
    if (mode.FogEnable && fogEnable)
    {
        eyez = Dots (V[a].eye.z, V[b].eye.z, V[c}.eye.z),
barycentric);
        f = CalculateFog (eyeZ);

switch (d)
        {
            // Vertex store 3 is not consecutive in tag space.
            case 0:     SendMessage (V0FloatF_Tag, f);
break;
            case 1:  SendMessage (V1FloatF_Tag, f);   break;
            case 2:  SendMessage (V2FloatF_Tag, f);   break;
        }
    }

// Coordinates.
    u.x = DotS (V[a].coord.x, V[b].coord.x, V[c].coord.x,
barycentric);
    u.y = DotS (V[a].coord.y, V[b].coord.y, V[c].coord.y,
barycentric);
    u.z = DotS (V[a].coord.z, V[b].coord.z, V[c].coord.z,
barycentric);

// Perspective projection and viewport mapping.
    u = u * invW;
    u = u * viewPortScale + viewPortOffset;

// Add in the polygon offset (it is 0.0 if not needed).
    u.z += clipZOffset;

SendVec3Message (DeltaCoord0_Tag + d, u);

V[d].sentParameters = false;
}
```

```
void SendClippedColourMessage    (int2 a, int2 b, int2 c,
                                  int2 provokingVertex, bool frontFacing,
                                  int2    dest,    bool useProvoking)
{
   clippedColourData = 0;
   clippedColourData.a = a;
   clippedColourData.b = b;
   clippedColourData.c = c;
   clippedColourData.dest = dest;
   clippedColourData.provokingVertex = provokingVertex;
   clippedColourData.frontFacing = frontFacing;
   clippedColourData.useProvokingVertex = useProvoking;
   SendMessage (ClippedColour_Tag, clippedColourData);
} void SelectClippedVertex (int4 s)
{
   Vec3    barycentric;
   Float   z;
   Float   w;

// Barycentric coordinate.
   barycentric = clipBuffer[s].barycentric;

z = Dots (V[a].coord.z, V[b].coord.z, V[c].coord.z), barycnetric);
   w = Dots (V[a].coord.w, V[b].coord.w, V[c].coord.w), barycnetric);

// Perspective projection and viewport mapping. Do as a reciprocal
   // and multiply to give consistent results with the normal rendering
   // case.
```

```
    w = 1.0 / w;
    z = z * w;
    z = z * viewPortScale.z + viewPortOffset.z;

SelectVertex (z);
}
```

Geometry Unit

The presently preferred embodiment for improved clipping performs the innovative process in the Geometry Unit 108 of the GAMMA pipeline.

The Geometry Unit 108 performs the following activities:

Implements the remaining geometry processing for points, lines, triangles and rectangles. This includes clip testing and (if necessary) clipping, backface culling, perspective division, viewport mapping. Polymode processing for triangles is also implemented.

Calculates the fog and texture values for any vertices requiring them. This is done lazily so only those vertices which pass the backface cull and clipping have values calculated. If the vertex is shared with the previous primitive then the value will not be calculated again.

Applies the PolygonOffset when enabled.

Tracks parameter storage in the Delta Unit 116 so that only those parameters which have changed are sent. This is not so important when the Delta Unit 116 in GAMMA is used but conserves bus bandwidth when the parameters are sent to another chip across the PCI bus.

Controls the Normalization Unit 110, Lighting Unit 112, and Material Unit 114 so they only process valid vertices. The Material Unit 114 is also instructed to generate color information for intermediate vertices produced when a primitive is clipped.

The OpenGL Feedback and Select modes are also supported so that Picking and 3D selection will be accelerated.

Controlling the Downstream Units The Normalization Unit 110, Lighting Unit 112, and Material Unit 114 are controlled, in the presently preferred embodiment, by the Geometry Unit 108 using the VertexColour message. This message defines which vertices are to have their color calculated. The VertexColour message defines up to 3 vertices to do the calculations for and provides flags to indicate if the vertex is part of a front facing primitive and if the provoking vertex is to be used (because of flat shading).

Each unit is responsible for performing only its calculations if any of the parameters associated with a vertex has changed, or if the vertex changes from a 'front facing' vertex to a back facing vertex or vice versa. The Material Unit 114 also tracks what colors are stored in the Delta Unit 116 and will only send the color when it is first calculated or the orientation of the vertex changes or the color has been overwritten due to clipping.

When a primitive is clipped, the two or three original vertices have their colors calculated by the VertexColour message before visible parts of the primitive are rendered. The color of the intermediate vertices are calculated in the Material Unit 114 under control of the ClippedColour message issued by the Geometry Unit 108. Before this message is sent, the vertex colors will already have been established via the VertexColour message.

All the color calculations are deferred until after the clipping and backface culling has been done so they are only done when a vertex is really going to be used. Any changes to the material parameters, lighting parameters, etc. cannot be done while there are outstanding colors to be calculated. The Normalization Unit 110 monitors the message stream while between a Begin/End sequence for any messages which, if allowed to proceed, would cause the deferred color to be calculated using the new (and hence wrong) parameter. When such a situation is detected any deferred normals are validated and the ValidateVertexColours message sent. This will force the Lighting Unit 112 and Material Unit 114 to calculate any outstanding colors before the material, fog, etc. parameter has a chance to change. Once the ValidateVertexColours message has been sent, the message which caused the validation to occur is passed on.

During Feedback mode the vertex colors are inserted into the message stream by the Material Unit 114 when the Geometry Unit 108 sends a VertexColourFeedback message. The colors at the intermediate points generated during clipping are calculated in the Material Unit 114 when prompted by the ClippedColourFeedback message, also issued by the Geometry Unit 108.

Geometry Unit Operation

Floating Point Units

The floating point units follow the IEEE single precision format

Viewport Mapping

The viewport mapping takes the 4D homogeneous vertex coordinates and converts them into a 3D coordinate by dividing through by the homogenous component 'w'. The resulting coordinate is often called the normalized device coordinate (or NDC). However, prior to clipping the NDC may extend beyond the ±1.0 range usually associated with normalized numbers.

The NDC is converted to a device coordinate by multiplying it by the ViewportScale vector and then adding the ViewportOffset vector. The X and Y values are scaled so the true NDC range (±1.0) fills the window (or viewport) while the Z value is nominally scaled to be in the range 0.0–1.0, although the OpenGL glDepthRange function can be used to change this.

It is preferable to bias the window coordinates (x, y) into a range where the number of fraction bits are constant from the minimal value in the range to the largest value in the range. This ensures that calculation based on the window coordinates such as the triangles area are position independent within a window and not susceptible to errors arising from fewer fraction bits being available in the top right corner than in the bottom left corner. This can be done by adjusting the ViewportOffset, however this bias will need to be removed in the Delta Unit 116 when the actual rasterizer coordinates are calculated. Also as this is an internal adjustment done for numerical reasons it is not visible to the user so any coordinate information returned during feedback mode will need to have any bias removed.

Improved Clipping

In the preferred embodiment, clipping is implemented prior to any lighting, fog or texture calculations are done so that the (expensive) lighting is only done for vertices which are guaranteed to be used for rendering. Traditional clipping is done once all the parameters (texture, color, fog, etc.) have been evaluated for the primitive. However, deferring the lighting (and texture, fog, etc.) calculations until after clipping prevents these calculations being done if the primitive is subsequently shown to be out of view. The clip test may show a primitive is partially in view, but in fact it may not be in view at all. Another savings is that during the clipping process many intermediate vertices are generated and the interpolated parameters do not need to be calculated for these intermediate points. Only the final intersection points once clipping is done have the full set of parameters calculated for them.

In the presently preferred embodiment, all vertices (original, intermediate and final intersection points) are defined using barycentric coordinates. The barycentric coordinate for vertex a is (1, 0, 0), for vertex b (0, 1, 0) and vertex c is (0, 0, 1). No provision is made for the special case of an original vertex being referenced (to save the linear combination calculation) to simplify the behavioral model. The weighting given to a parameter at a vertex is given by the associated barycentric component. If the barycentric coordinate for the intersection point is (a, b, c) and the parameter at vertex a is $P_a$ at vertex $_b$ is $P_b$ etc. then the parameter at the intersection point is given by:

$P_i = aP_a + bP_b + cP_c$

For line primitives, the same method is used but now c=0. No attempt is made to optimize the equations in this case to factor out the unused term.

Clipping is performed against the viewing frustrum and up to 6 user defined clipping planes. The viewing frustrum is defined by the planes:
left x=−w
right x=+w
top y=+w
bottom y=−w
near z=+w
far z=−w where w is the forth component of the vertex.

The user clipping planes are defined in eye space by the 4 coefficients (per clip plane) UserClipX, UserClipY, UserClipZ and UserClipW which are synonymous with the a, b, c, and d parameters, respectively, in the usual plane equation formula. A point is in view, if after substitution into the user clip plane equation, the result is positive.

The result of comparing a vertex against the 6 frustrum planes and the 6 user clipping planes is held in a 12 bit outcode variable. If the vertex is visible with respect to one of the planes then the corresponding bit is zero.

Each vertex is defined by the four values: x, y, z, and w and is visible only if all the following conditions are met:
(left)−w<=x<=w (right)
(bottom)−w<=y<=w (top)
(near)−w<=z <=w (far)

Each one of these 6 conditions is represented by a bit in an outcode word. If a condition is true then the corresponding bit is 0.

If the user clipping plane is defined by the four values: a, b, c and d then the vertex is visible if:

$ax + by + cz + d \geq 0$

If this condition is true for a given user clip plane then the corresponding bit in the outcode word is 0.

When an intersection point is to be calculated, the barycentric coordinates are found rather than the xyzw, rgba, f, stq, ks and kd values as they take up less storage. For intersection points which are never used there is a computation saving, but intersection points which are used need extra computations to yield the parameter values at the intersection.

Figure 4:
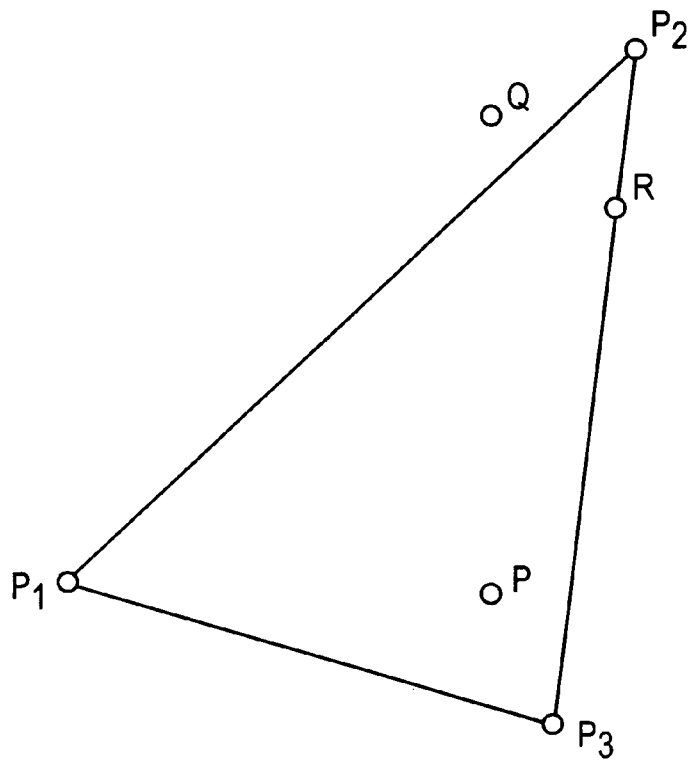
FIG. 4 depicts a triangle frame with points PQR.
Figure 5:
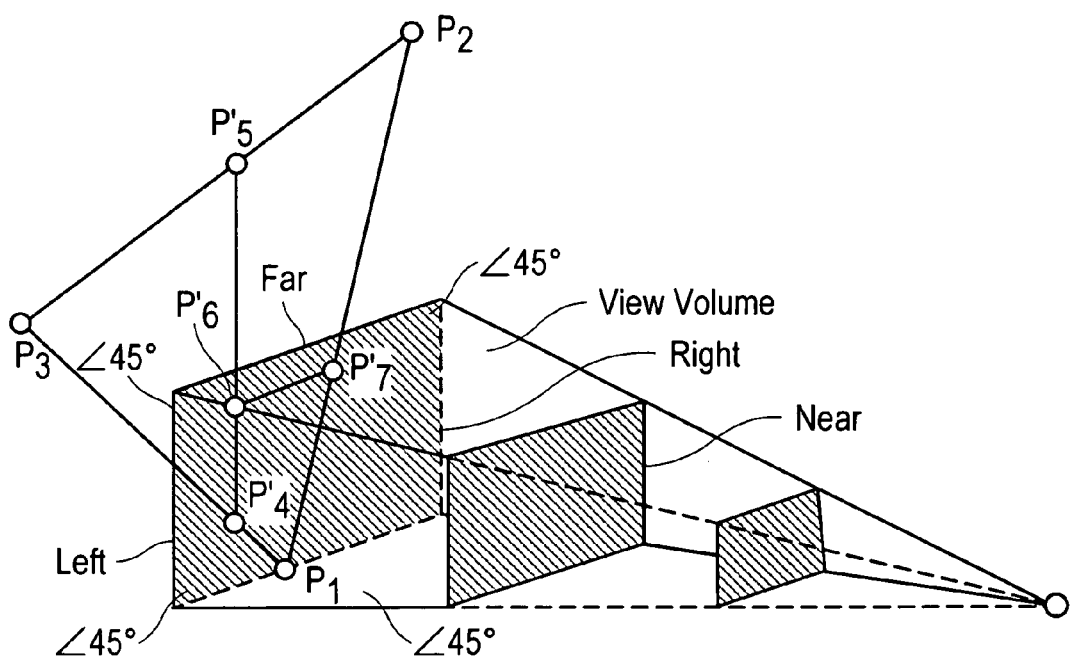
FIG. 5 depicts the triangle primitive of FIG. 4 intersecting the top and left planes of the viewing frustrum.
Figure 6:
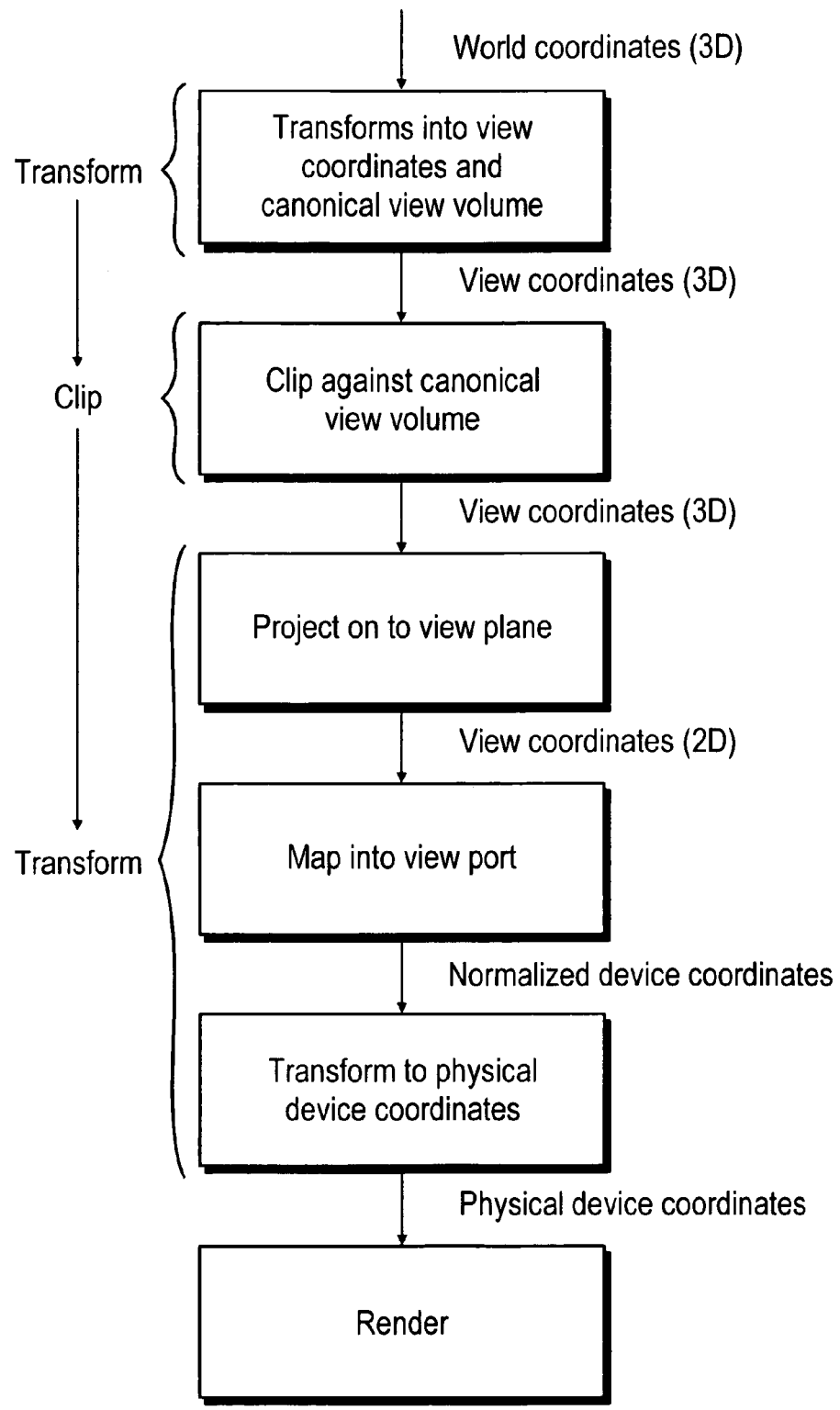
FIG. 6 depicts a high-level block diagram of processes performed in a 3D graphics computer system.

For example, FIG. 5 depicts the triangle primitive of FIG. 4 intersecting the top and left planes of the viewing frustrum. Point $P_1$ is in the interior of the viewing frustrum while points $P_2$ and $P_3$ lie outside of the viewing frustrum. During clipping, the first plane to clip the primitive is the left viewing frustrum plane. Clipping of the primitive along the left plane results in a quadrilateral with an edge along the left plane and two new intersection points, $P_4'$ and $P_5'$. This new quadrilateral, $P_1P_4'P_5'P_2$ will then be clipped against the top plane of the viewing frustrum. This clip results in two new intersection points, $P_6'$ and $P_7'$, and in points, $P_5'$ and $P_3$ being discarded. The resulting quadrilateral, $P_1P_4'P_6'P_7'$, contains only one of the original primitive points and three new intersection points.

Intermediate intersection point $P_5'$ is never used. Therefore, a computational savings occurs as only its barycentric coordinates have been calculated. The savings is benchmarked over current clipping processes not incorporating barycentric coordinates. In such processes, calculation of parameters xyzw, rgba, f, etc. occurs for each point discarded or not. For those points which are not discarded, the use of barycentric coordinates results in a little more computation. However, the use of barycentric coordinates results in an overall savings. The amount of savings varies depending of the clipped out geometry.

The input and output clipped polygons are stored in a circular buffer rather than two separate buffers which are ping-ponged between as this takes up much less storage. Each clip plane can add at most one extra vertex so with 12 clip planes and 4 vertices we need enough storage for a maximum of 16 vertices (or 32 if two separate buffers were to be used).

Figure 8:
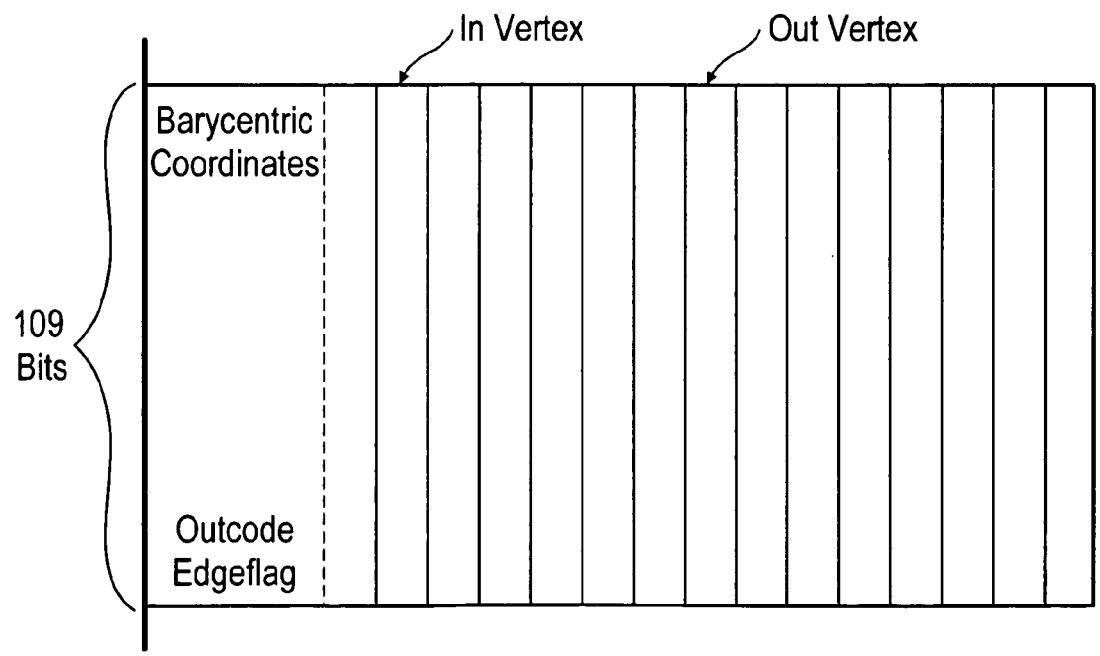
FIG. 8 depicts a block diagram of a circular buffer for storing input and output clipped polygons.

A circular buffer works well in the context of polygon clipping because once an entry has been processed it is not needed again and the entries are processed sequentially. FIG. 8 depicts a block diagram of a circular buffer for storing input and output clipped polygons. This clipping circular buffer is 16 entries deep, one entry per vertex. Each entry is 109 bits wide, holding: a barycentric coordinate consisting of three floating point values, a twelve bit outcode, and an edge flag indicating if the barycentric point is on the edge of a particular plane. Pointers OutVertex and InVertex are used to mark the head and tail of the circular buffer, respectively.

Threshold Clipping

Short lines and small triangles can optionally avoid being clipped providing they don't cross the near or far frustrum clipping planes or any of the user clipping planes. In this case, the whole line or triangle is rasterized in full and the screen and window scissor is used to discard out of view fragments. This can be more efficient than doing a full clip. The threshold at which clipping occurs for lines and triangles is user defined.

System Context

Figure 7:
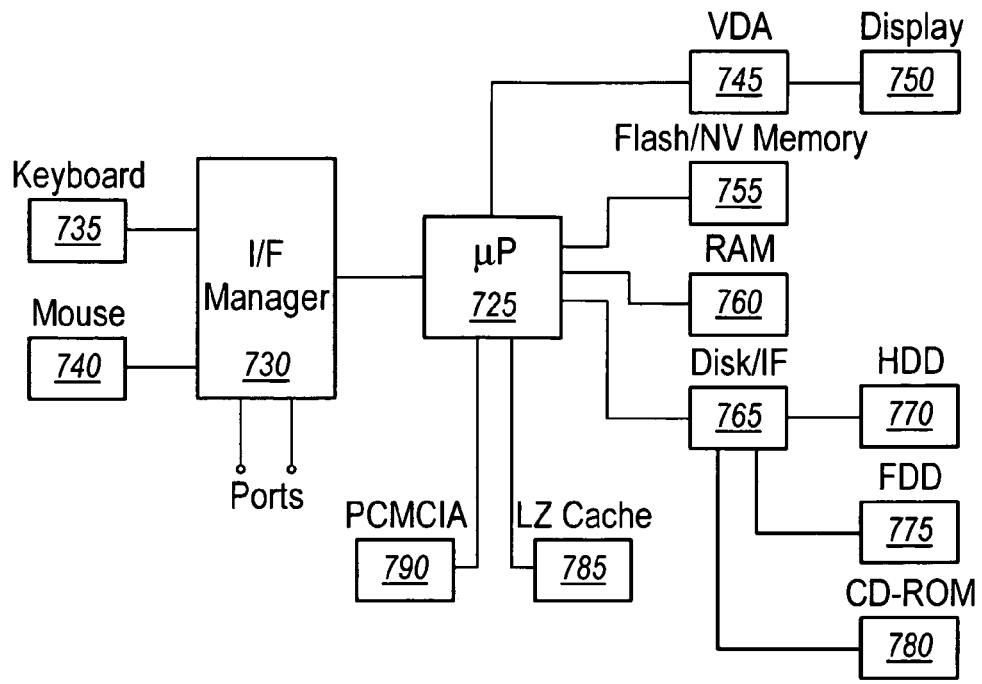
FIG. 7 depicts a block diagram of a system which can utilize the innovations.

FIG. 7 shows a personal computer which can take advantage of the improved clipping process. The complete personal computer system, includes in this example:
user input devices (e.g. keyboard 735 and mouse 740);
at least one microprocessor 725 which is operatively connected to receive inputs from said input device, through an interface manager chip 730 (which also provides an interface to the various ports);
a memory (e.g. flash or non-volatile memory 755 and RAM 760), which is accessible by the microprocessor;
a data output device (e.g. display 750 and video display adapter card 745) which is connected to output data generated by the microprocessor 725; and
a magnetic disk drive 770 which is read-write accessible, through an interface unit 765, by the microprocessor 725;

Optionally, of course, many other components can be included, and this configuration is not definitive by any means. For example, the personal computer may also include a CD-ROM drive 780 and floppy disk drive ("FDD") 775 which may interface to the disk interface controller 765. Additionally, L2 cache 785 may be added to speed data access from the disk drives to the microprocessor, and a PCMCIA 790 slot accommodates peripheral enhancements.

The GAMMA 3D Geometry and Lighting Accelerator chip incorporating the innovative improved clipping process is be used with a graphics accelerator such as GLINT™ in the data output device to drive the display 750.

Figure 9:
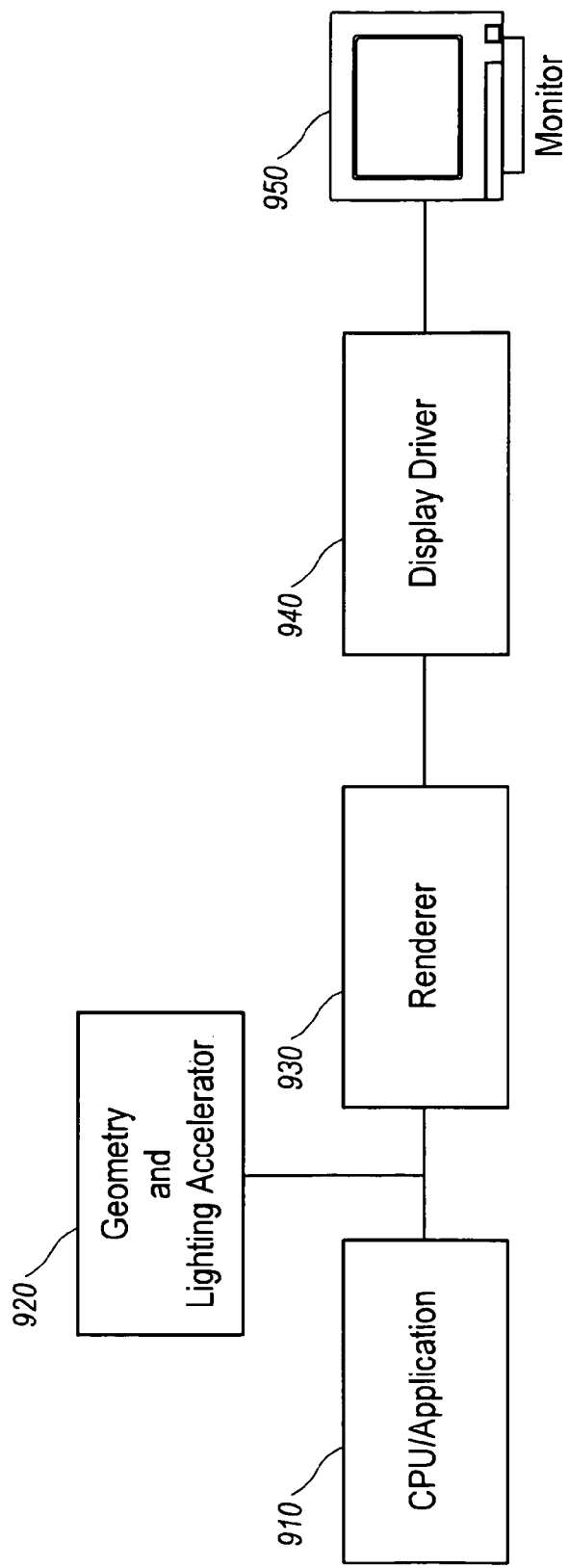
FIG. 9 shows a high level view of the display system of a graphics computer system.

FIG. 9 shows a high level view of the display system of a graphics computer system. The CPU 910 executes an application which requires three-dimensional images. The application generates graphics data to be rendered to a geometry and lighting accelerator 920 which implements the disclosed improved triangle clipping method. After clipping, graphics data is then passed to the renderer 930. The renderer generates the image and stores it in a frame buffer.

The frame buffer is read by the display driver 940, which draws the image on the monitor 950.

According to a disclosed class of innovative embodiments, there is provided: a method for clipping graphics primitives for display, comprising the steps of: defining all vertices of a primitive using relational coordinates; using a clipping algorithm with a circular buffer to store input and output polygons of said primitive; and for each vertex of said polygons: indicating whether it is visible with respect to each plane of a view volume.

According to another disclosed class of innovative embodiments, there is provided: a geometry unit, comprising: circuitry to define all vertices of a primitive using relational coordinates; circuitry to implement a clipping algorithm with a circular buffer to store input and output polygons of said primitive; and circuitry to set an outcode value for each said vertex indicating whether it is visible with respect to each of plane of said view volume.

According to another disclosed class of innovative embodiments, there is provided: a pipelined graphics system, comprising: a transformation unit connected to: transform a primitive into a clipping space, and assign a fixed barycentric coordinate to each vertex of said primitive; and a geometry unit connected to: perform clip testing on said primitives, clip said primitives, if necessary, according to said fixed barycentric coordinates, and set an outcode value for each said vertex indicating whether it is visible with respect to each plane of a view volume.

According to another disclosed class of innovative embodiments, there is provided: a computer system comprising: display hardware; a processor connected to provide graphics data a geometry and lighting accelerator connected to receive said graphics data, comprising a transformation unit connected to: transform a primitive into a clipping space, and assign a fixed barycentric coordinate to each vertex of said primitive; and a geometry unit connected to: perform clip testing on said primitives, clip said primitives, if necessary, according to said fixed barycentric coordinates, set an outcode value for each said vertex indicating whether it is visible with respect to each plane of a view volume, and output clipped graphics data to be rendered; and video rendering hardware connected to receive said clipped graphics data, generate graphics, and connected to display said graphics on said display hardware.

A vast amount of engineering effort has been invested in computer graphics systems, and this area is one of increasing activity and demands. The following background publications provide additional detail regarding possible implementations of the disclosed embodiments, and of modifications and variations thereof: see, generally, ADVANCES IN COMPUTER GRAPHICS (ed. Enderle 1990-); Chellappa and Sawchuk, DIGITAL IMAGE PROCESSING AND ANALYSIS (1985); COMPUTER GRAPHICS HARDWARE (ed. Reghbati and Lee 1988); COMPUTER GRAPHICS: IMAGE SYNTHESIS (ed. Joy et al.); Foley et al., FUNDAMENTALS OF INTERACTIVE COMPUTER GRAPHICS (2.ed. 1984); Foley, COMPUTER GRAPHICS PRINCIPLES & PRACTICE (2.ed. 1990); Foley, INTRODUCTION TO COMPUTER GRAPHICS (1994); Giloi, Interactive Computer Graphics (1978); Hearn and Baker, COMPUTER GRAPHICS (2.ed. 1994); Hill, COMPUTER GRAPHICS (1990); Latham, DICTIONARY OF COMPUTER GRAPHICS (1991); Magnenat-Thalma, IMAGE SYNTHESIS THEORY & PRACTICE (1988); Newman and Sproull, PRINCIPLES OF INTERACTIVE COMPUTER GRAPHICS (2.ed. 1979); PICTURE ENGINEERING (ed. Fu and Kunii 1982); PICTURE PROCESSING & DIGITAL FILTERING (2.ed. Huang 1979); Prosise, HOW COMPUTER GRAPHICS WORK (1994); Rimmer, BIT MAPPED GRAPHICS (2.ed. 1993); Salmon, COMPUTER GRAPHICS SYSTEMS & CONCEPTS (1987); Schachter, COMPUTER IMAGE GENERATION (1990); Watt, THREE-DIMENSIONAL COMPUTER GRAPHICS (2.ed. 1994); Scott Whitman, MULTIPROCESSOR METHODS FOR COMPUTER GRAPHICS RENDERING; the SIGGRAPH PROCEEDINGS for the years 1980-to date; and the IEEE Computer Graphics and Applications magazine for the years 1990-to date; all of which are hereby incorporated by reference.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

The foregoing text has indicated a large number of alternative implementations, particularly at the higher levels, but these are merely a few examples of the huge range of possible variations.

For example, In the preferred embodiment GAMMA is used to accelerate geometry and lighting calculations for the GLINT™ family of graphics accelerators. However, GAMMA makes use of a standard interface. Therefore, GAMMA can be used in conjunction with a multitude of graphics accelerator cards of the same or different manufacturer.

For another example, the examples given in present disclosure make use of the OpenGL graphics API. However, GAMMA currently supports other standard API such as Direct3D and QuickDraw 3D and is easily adaptable to support proprietary standards.

For another example, the preferred chip context can be combined with other functions, or distributed among other chips, as will be apparent to those of ordinary skill in the art.

For another example, the described graphics systems and subsystems can be used, in various adaptations, not only in high-end PC's, but also in workstations, arcade games, and high-end simulators.

For another example, the described graphics systems and subsystems are not necessarily limited to color displays, but can be used with monochrome systems.

For another example, the described graphics systems and subsystems are not necessarily limited to displays, but also can be used in printer drivers.

What is claimed is:

1. A method for clipping graphics primitives for display, comprising the steps of:
    performing a clipping algorithm which uses only a single circular buffer to store input and output vertices of a primitive; and
    for each one of said vertices, indicating whether said one of said vertices is visible with respect to each plane of a view volume.

2. The method of claim 1, wherein only vertices which are visible in all said planes are rasterized.

3. The method of claim 1, wherein said performing step is executed prior to any lighting, fog, or texture calculations.

4. The method of claim 1, wherein said view volume is a frustrum.

5. The method of claim 1, wherein there are six or more planes in said view volume.

6. The method of claim 1, wherein there are six planes in said view volume.

7. The method of claim 1, wherein there are twelve planes in said view volume.

8. The method of claim 1, wherein said clipping algorithm is the Sutherland and Hodgman polygon clipping algorithm.

9. The method of claim 1, wherein vertex visibility in each of said planes is indicated by a bit flag.

10. The method of claim 1, wherein vertex visibility is indicated by twelve bit code.

11. The method of claim 1, wherein two circular buffers are used to store said input and output polygons.

12. The method of claim 1, wherein said circular buffer has a maximum storage of sixteen vertices.

13. The method of claim 1, further comprising defining all said vertices of said primitive using relational coordinates.

14. A geometry unit, comprising:
circuitry to define all vertices of a primitive using relational coordinates;
circuitry to implement a clipping algorithm which uses only a single circular buffer to store input and output vertices of a primitive; and
circuitry to set an outcode value for each of said vertices indicating whether it is visible with respect to individual planes of said view volume.

15. The geometry unit of claim 14, wherein only vertices which are visible in all said planes are rasterized.

16. The geometry unit of claim 14, wherein said clipping algorithm is implemented prior to any lighting, fog, or texture calculations.

17. The geometry unit of claim 14, wherein said primitive is a triangle.

18. The geometry unit of claim 14, wherein said relational coordinates are barycentric.

19. The geometry unit of claim 14, wherein said view volume is a frustrum.

20. The geometry unit of claim 14, wherein there are six or more planes in said view volume.

21. The geometry unit of claim 14, wherein said clipping algorithm is the Sutherland and Hodgman polygon clipping algorithm.

22. The geometry unit of claim 14, wherein vertex visibility in each of said planes is indicated by a bit flag.

23. The geometry unit of claim 14, wherein two circular buffers are used to store said input and output polygons.

24. The geometry unit of claim 14, wherein said circular buffer has a maximum storage of sixteen vertices.

25. A computer system comprising:
display hardware;
a processor connected to provide graphics data;
a geometry and lighting accelerator connected to receive said graphics data, said geometry and lighting accelerator comprising
a transformation unit connected to transform a primitive into a clipping space, and
a geometry unit connected to perform clip testing on said primitives, clip said primitives, if necessary,
set an outcode value for each said vertex indicating whether it is visible with respect to each plane of a view volume, and
output clipped graphics data to be rendered; and
video rendering hardware connected to receive said clipped graphics data and to generate graphics, and connected to display said graphics on said display hardware;
wherein said geometry unit uses only a single circular buffer to store input and output vertices of said primitive.

26. The computer system of claim 25, wherein said clipping is implemented prior to any lighting, fog, or texture calculations.

27. The computer system of claim 25, wherein said primitive is a triangle.

28. The computer system of claim 25, wherein said clipping uses the Sutherland and Hodgman polygon clipping algorithm.

29. The computer system of claim 25, wherein vertex visibility in each of said planes is indicated by a bit flag.

* * * * *